(12) United States Patent
Aoki et al.

(10) Patent No.: US 11,631,381 B2
(45) Date of Patent: Apr. 18, 2023

(54) INFORMATION PROCESSING APPARATUS, INFORMATION PROCESSING METHOD, AND PROGRAM FOR CONTROLLING INPUT POSITION IN AN OVERLAP REGION

(71) Applicant: SONY GROUP CORPORATION, Tokyo (JP)

(72) Inventors: Yu Aoki, Tokyo (JP); Kentaro Ida, Tokyo (JP); Yuri Kusakabe, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/288,280

(22) PCT Filed: Sep. 6, 2019

(86) PCT No.: PCT/JP2019/035111
§ 371 (c)(1),
(2) Date: Apr. 23, 2021

(87) PCT Pub. No.: WO2020/090228
PCT Pub. Date: May 7, 2020

(65) Prior Publication Data
US 2021/0390927 A1    Dec. 16, 2021

(30) Foreign Application Priority Data
Nov. 1, 2018 (JP) .............................. JP2018-206266

(51) Int. Cl.
*G09G 5/14* (2006.01)
*G06F 3/03* (2006.01)
*G06F 3/0354* (2013.01)

(52) U.S. Cl.
CPC ............. *G09G 5/14* (2013.01); *G06F 3/0304* (2013.01); *G06F 3/03542* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2012/0148096 A1* | 6/2012 | Lee | H04N 9/3179 382/103 |
| 2017/0046843 A1 | 2/2017 | Liu et al. | |
| 2017/0300176 A1* | 10/2017 | Chen | G06F 3/0418 |

FOREIGN PATENT DOCUMENTS

| | | |
|---|---|---|
| JP | 2005-252676 A | 9/2005 |
| JP | 2012-014237 A | 1/2012 |

(Continued)

*Primary Examiner* — Amare Mengistu
*Assistant Examiner* — Sarvesh J Nadkarni
(74) *Attorney, Agent, or Firm* — Paratus Law Group, PLLC

(57) ABSTRACT

It is desirable to provide a technology for enhancing quality of a displayed image in an overlap region among a plurality of display regions even in a case where a position of the displayed image is changed. There is provided an information processing apparatus including a display controller (134) that controls display of a displayed image in at least one display region of a plurality of display regions on the basis of an input position detected on the basis of a captured image, in which the plurality of display regions includes a first display region and a second display region, and in a case where the input position has moved to an overlap region where the first display region and the second display region overlap with each other, the display controller controls display of the displayed image in the overlap region on the basis of the input position before moving to the overlap region.

20 Claims, 17 Drawing Sheets

(56) References Cited

FOREIGN PATENT DOCUMENTS

| JP | 2012-027769 | A | 2/2012 |
| JP | 2014-186104 | A | 10/2014 |
| JP | 2018-010602 | A | 1/2018 |
| JP | 2018-132799 | A | 8/2018 |

* cited by examiner

[ FIG. 1 ]
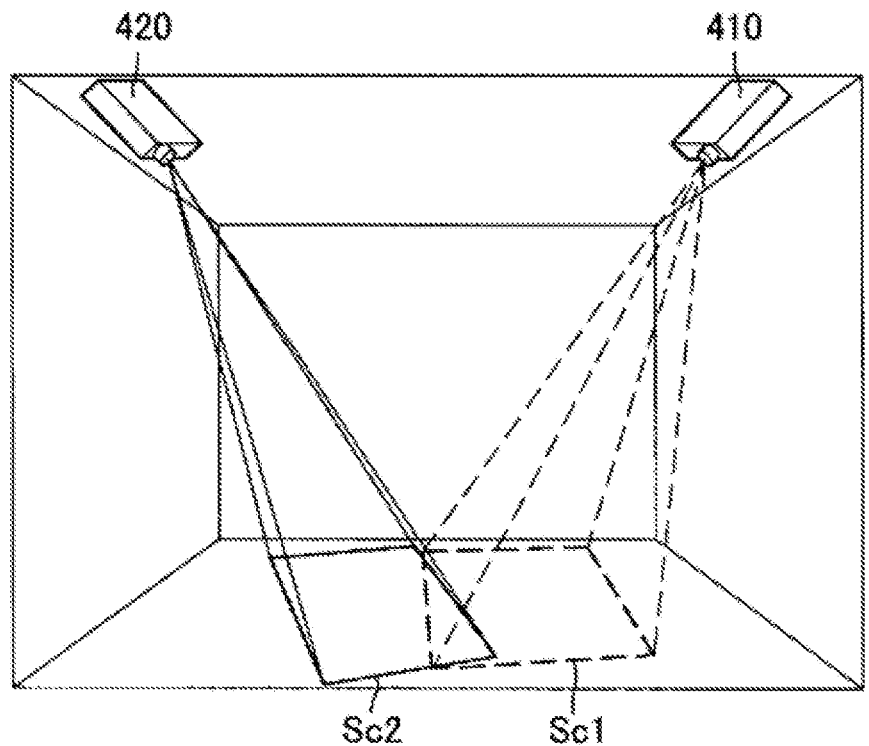
[ FIG. 2 ]
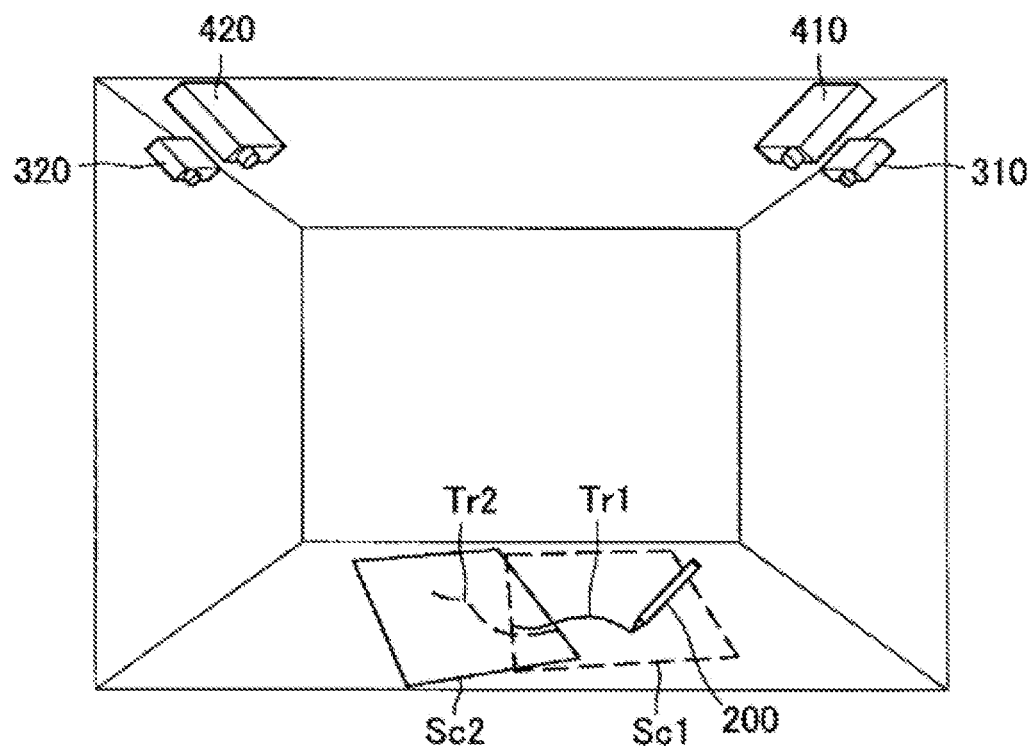

[FIG. 3]
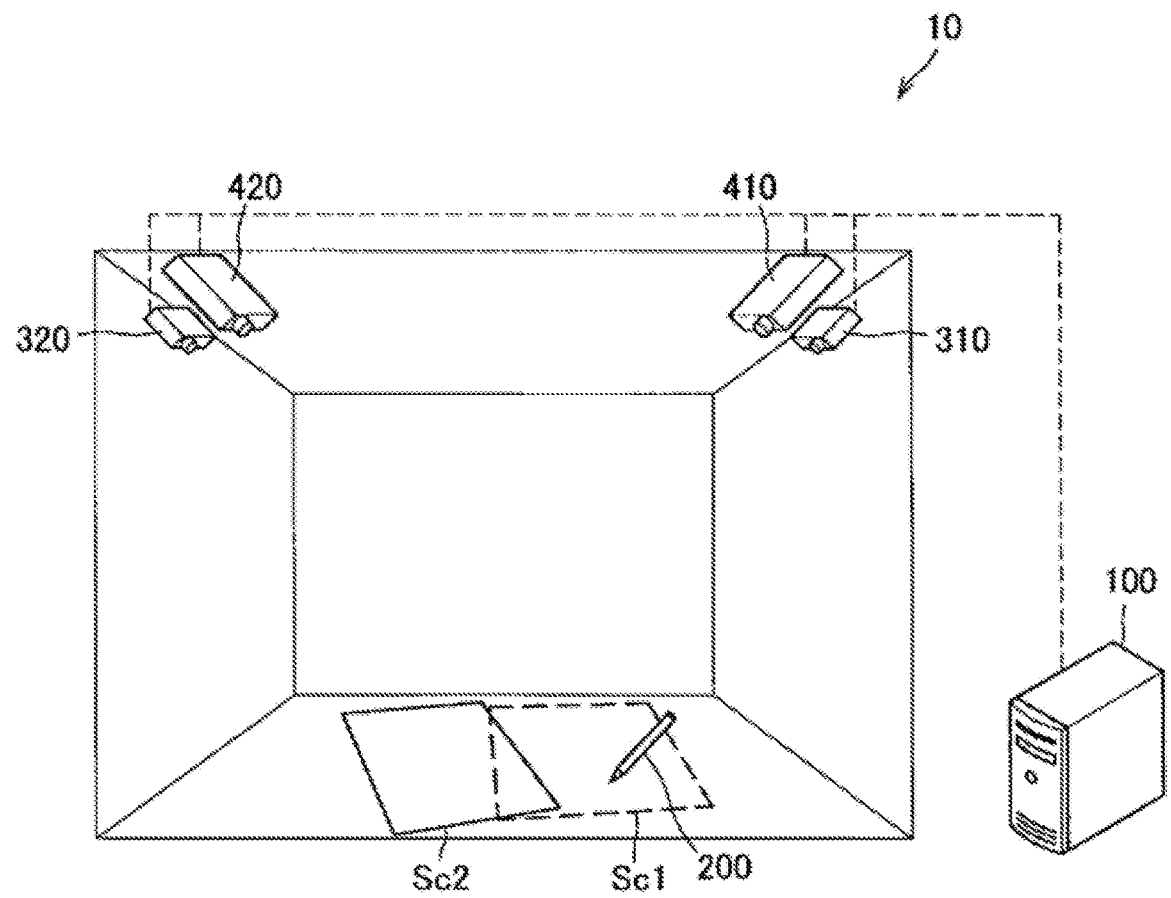

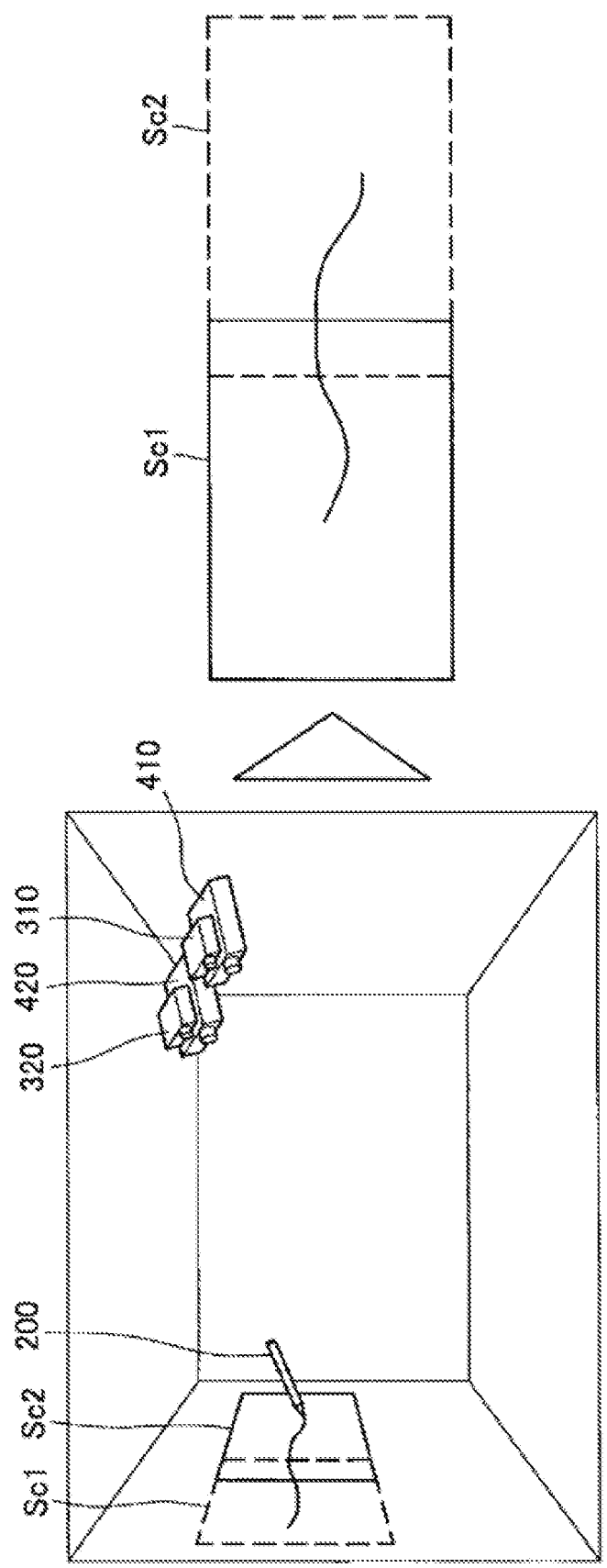

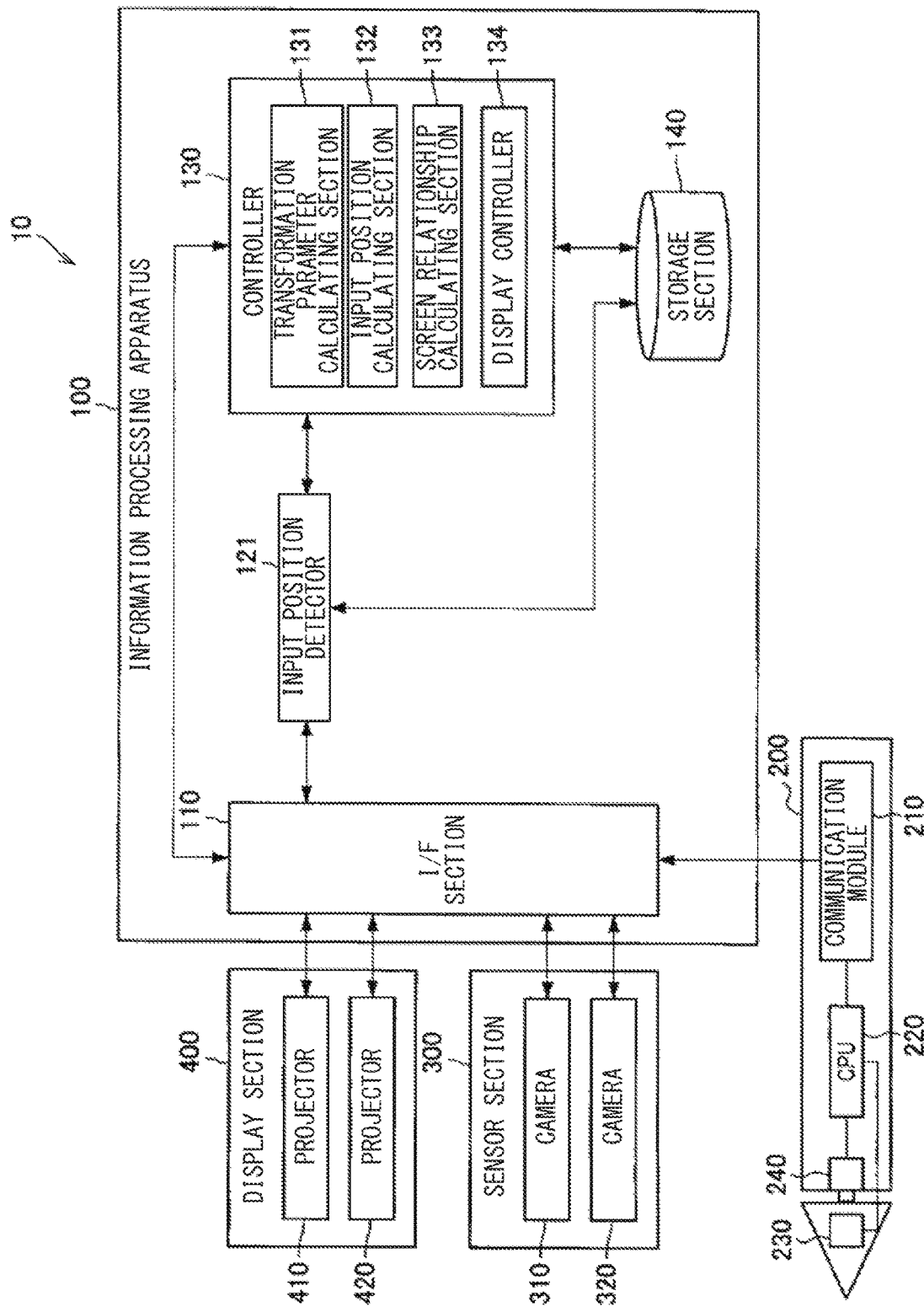
[FIG. 5]

[FIG. 6]
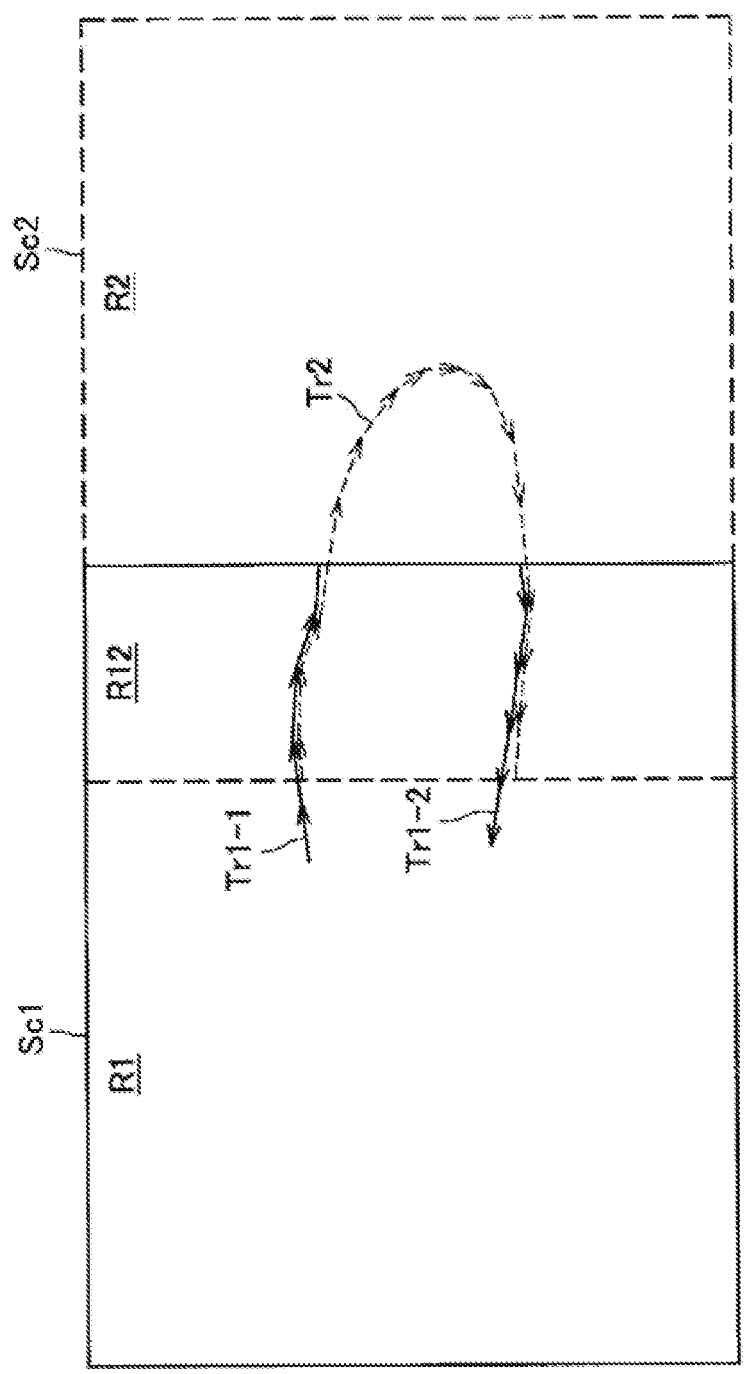

[FIG. 7]
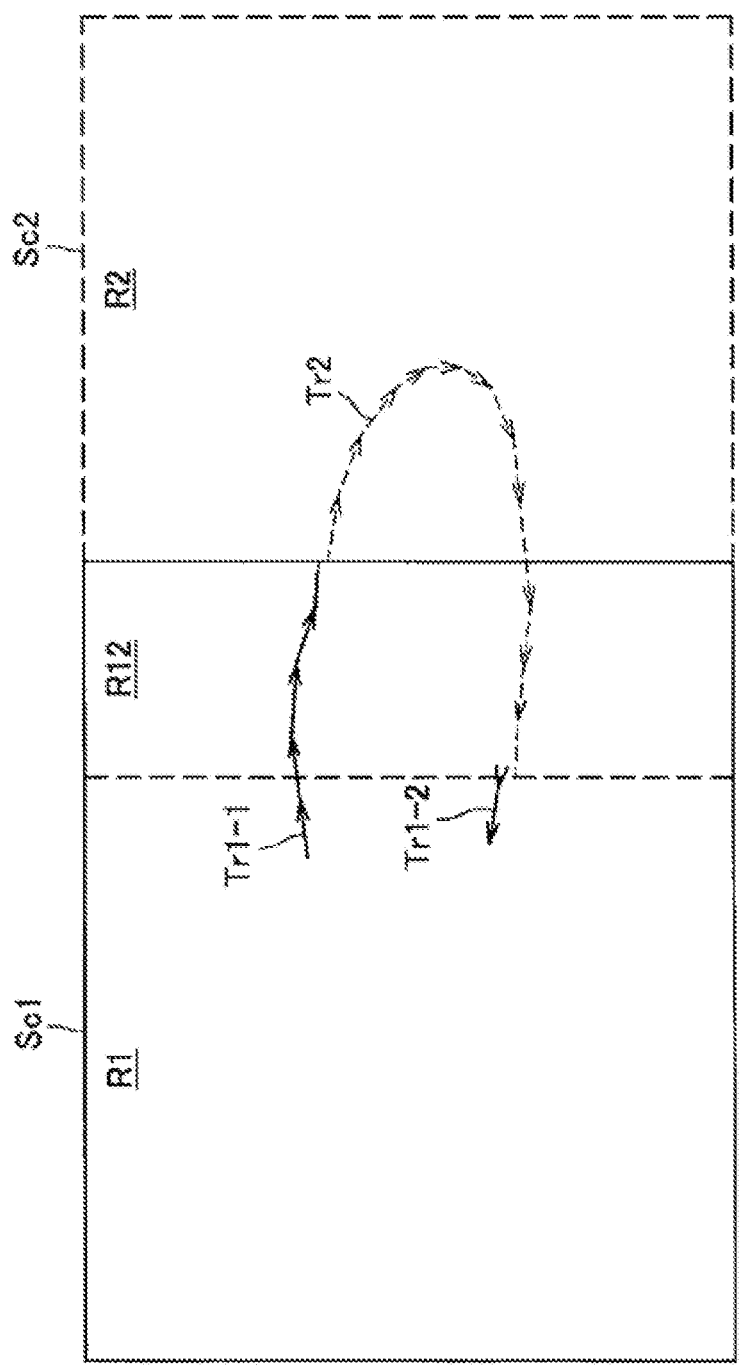

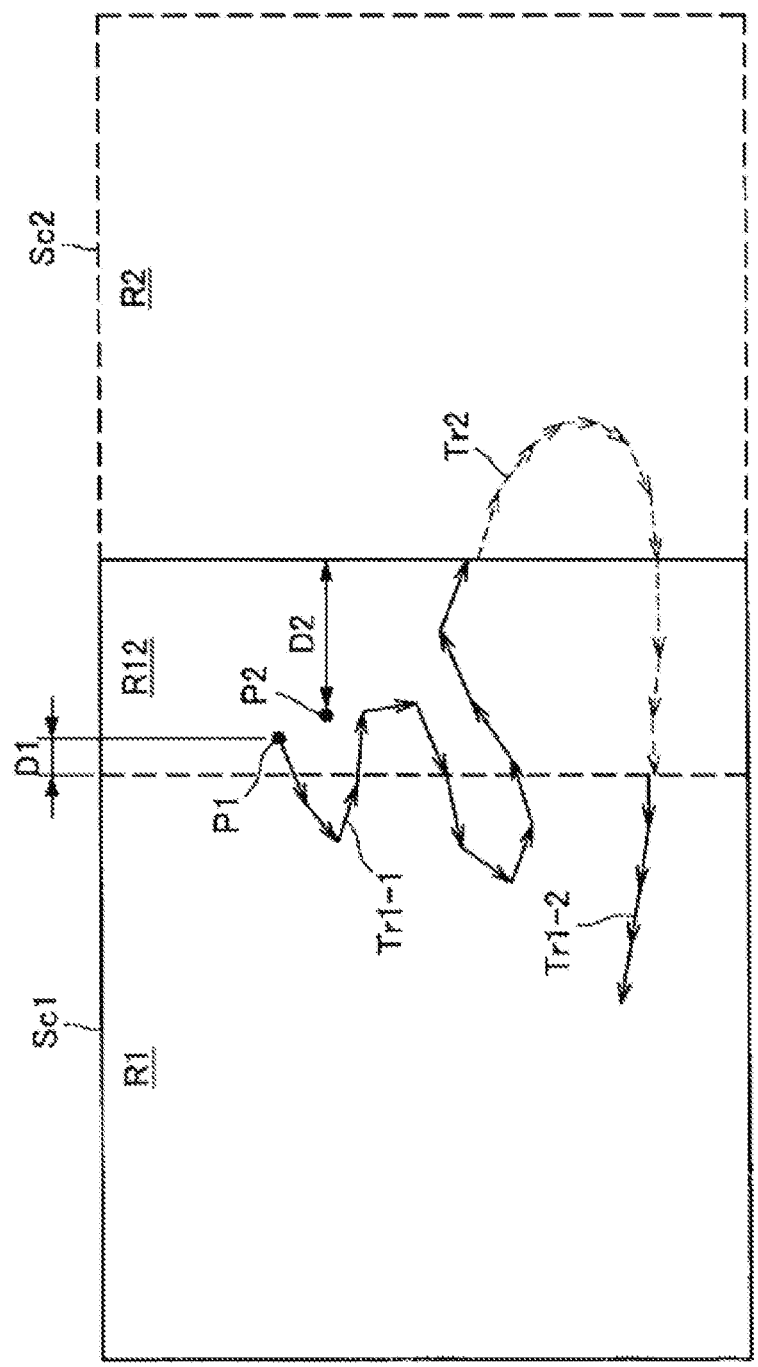
[FIG. 8]

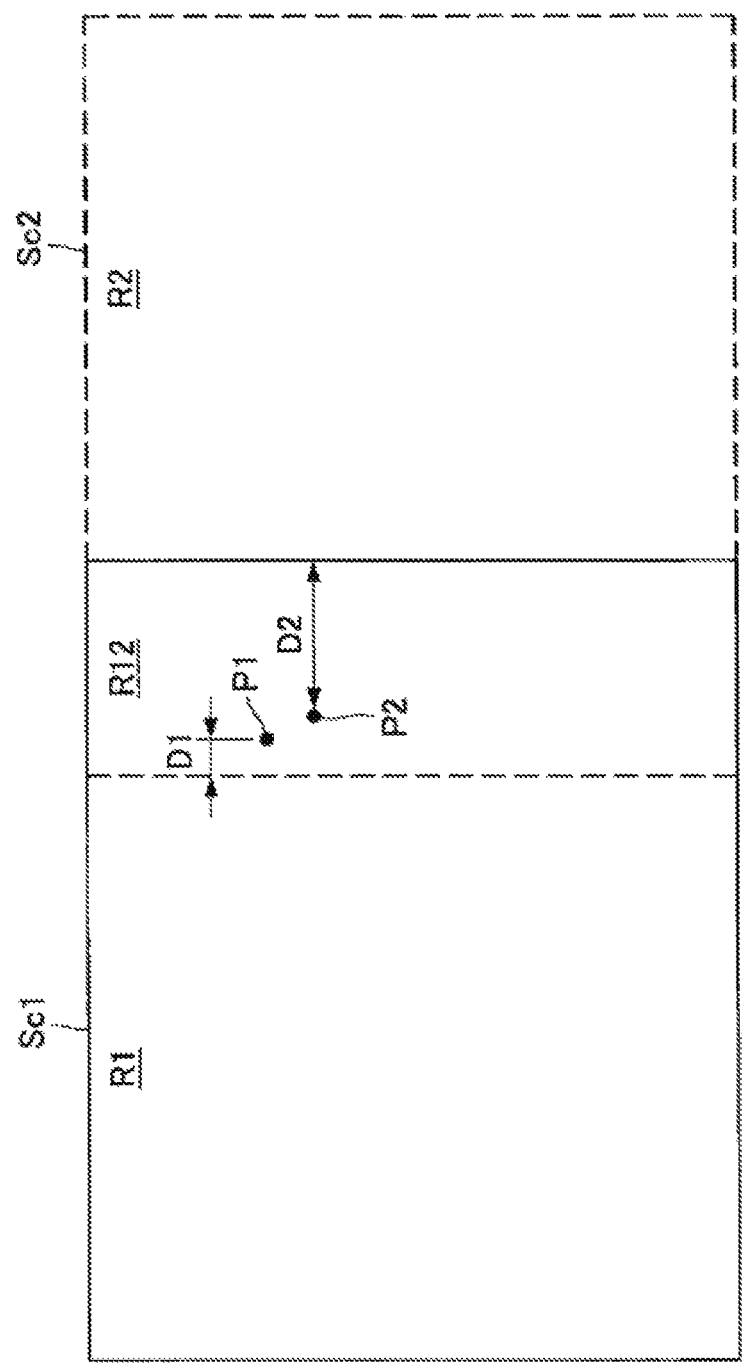

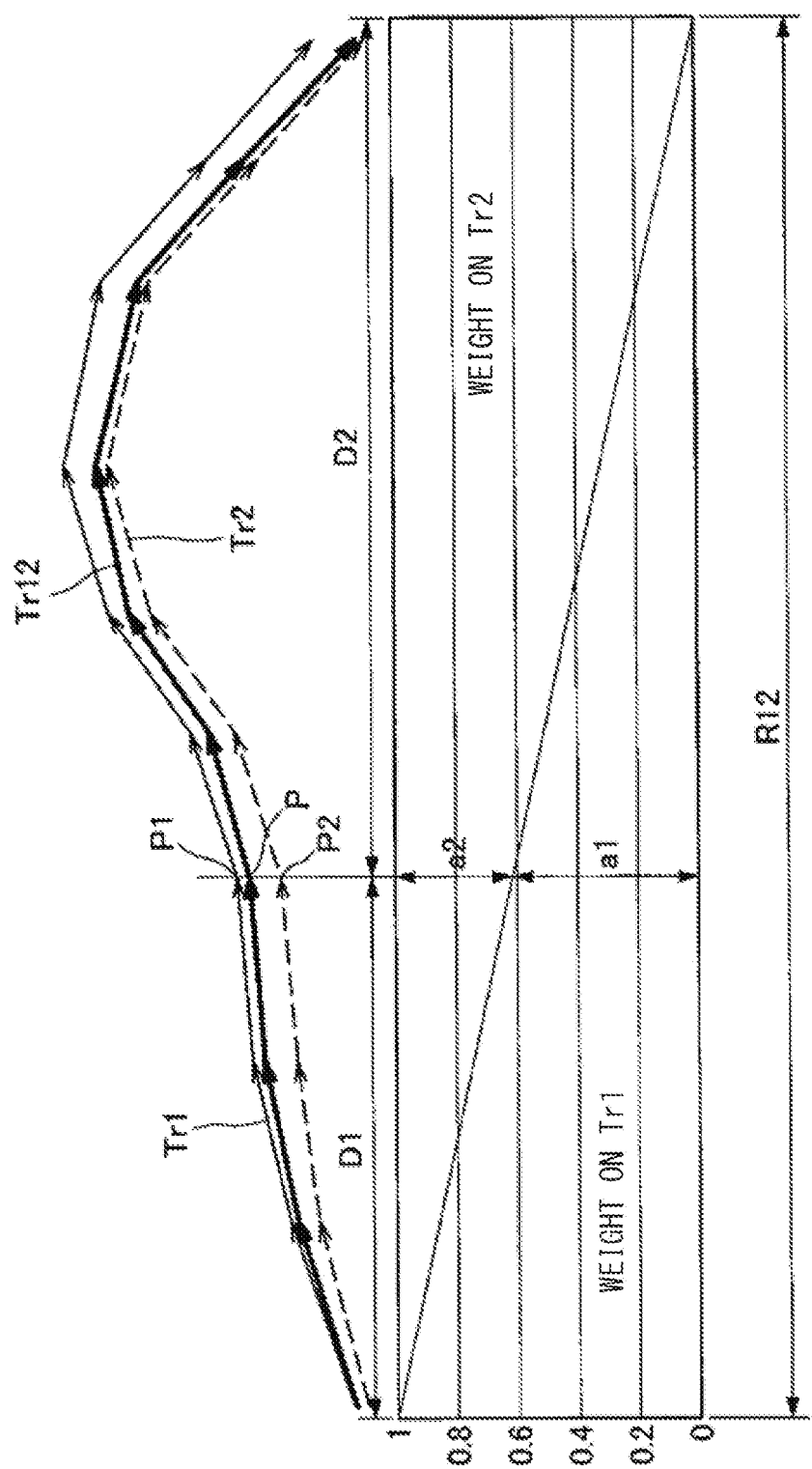
[FIG. 10]

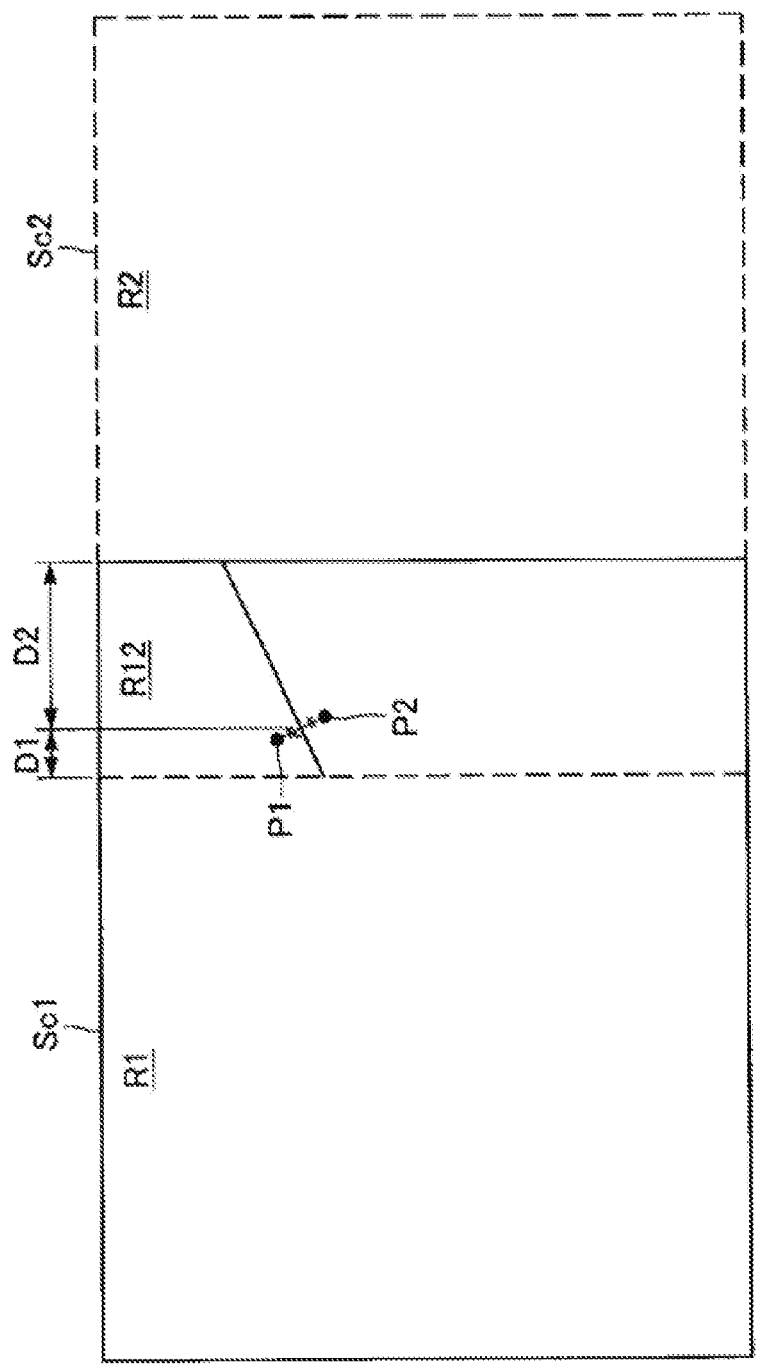
[FIG. 11]

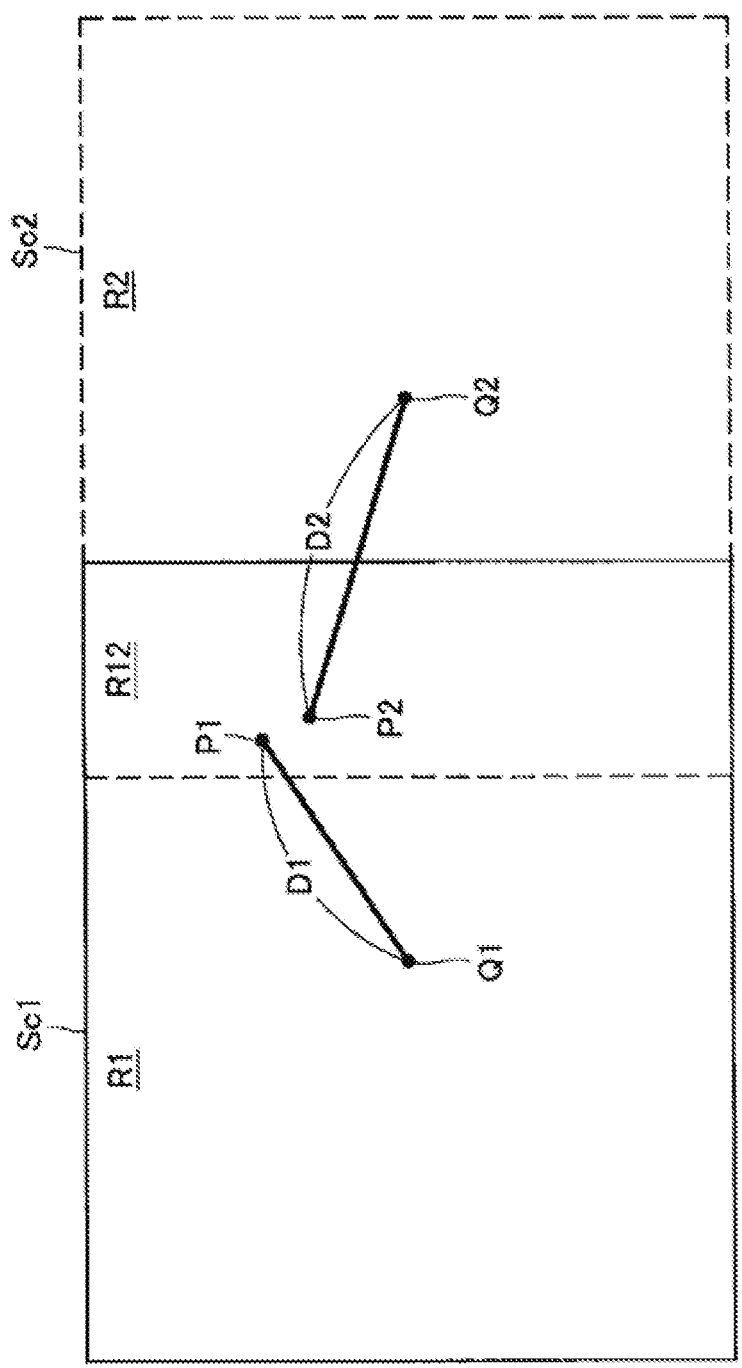
[FIG. 12]

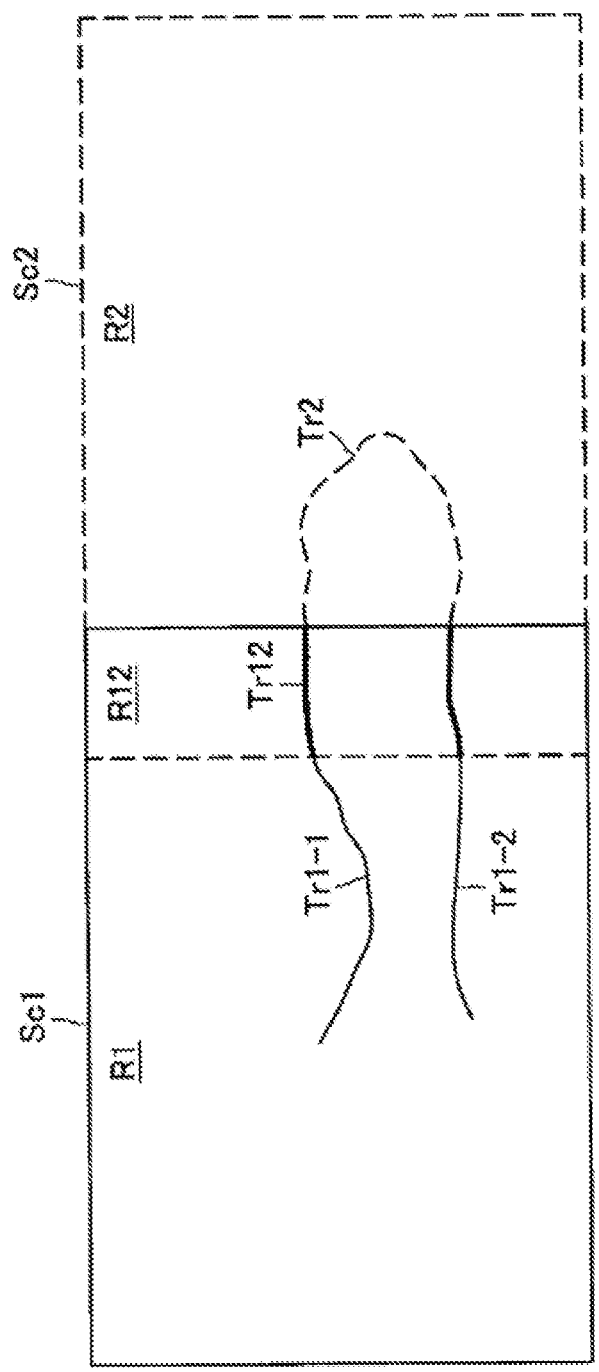
[FIG. 13]

[FIG. 14]
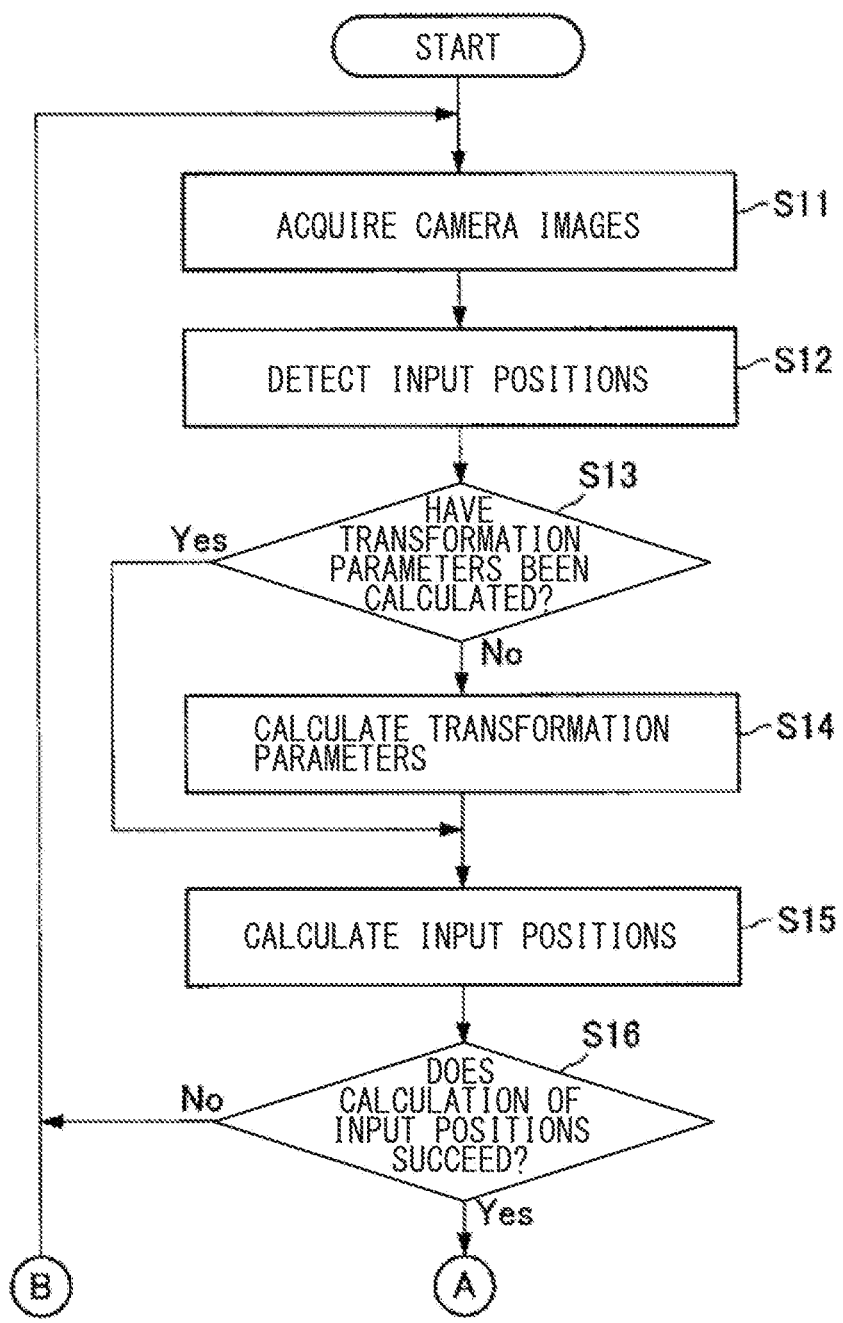

[ FIG. 15 ]
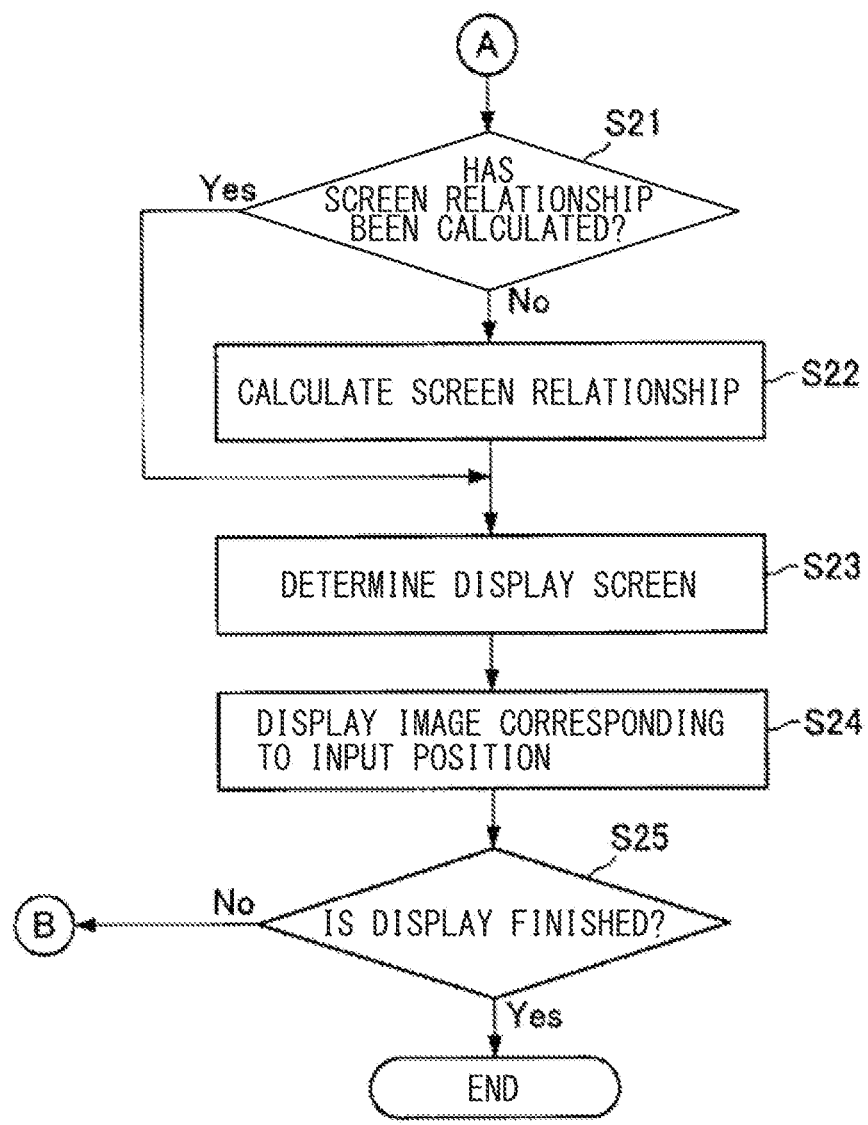

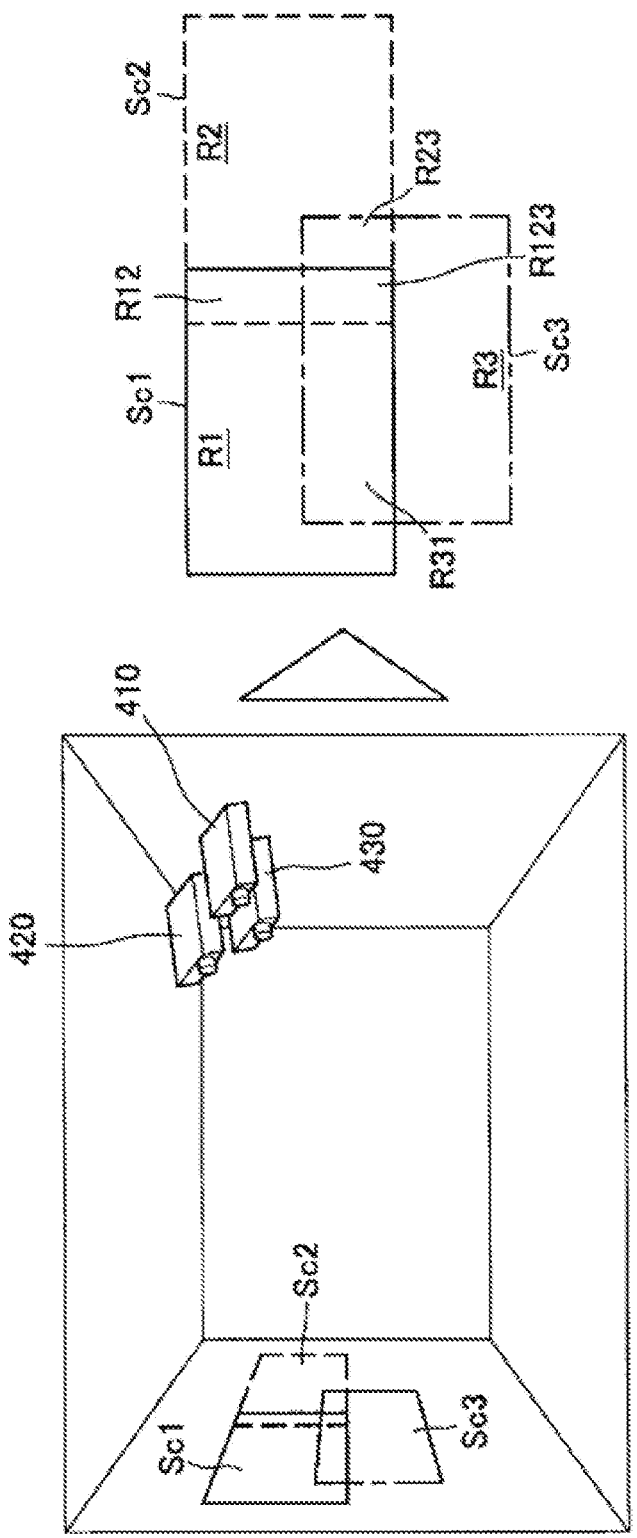
[FIG. 16]

[ FIG. 17 ]
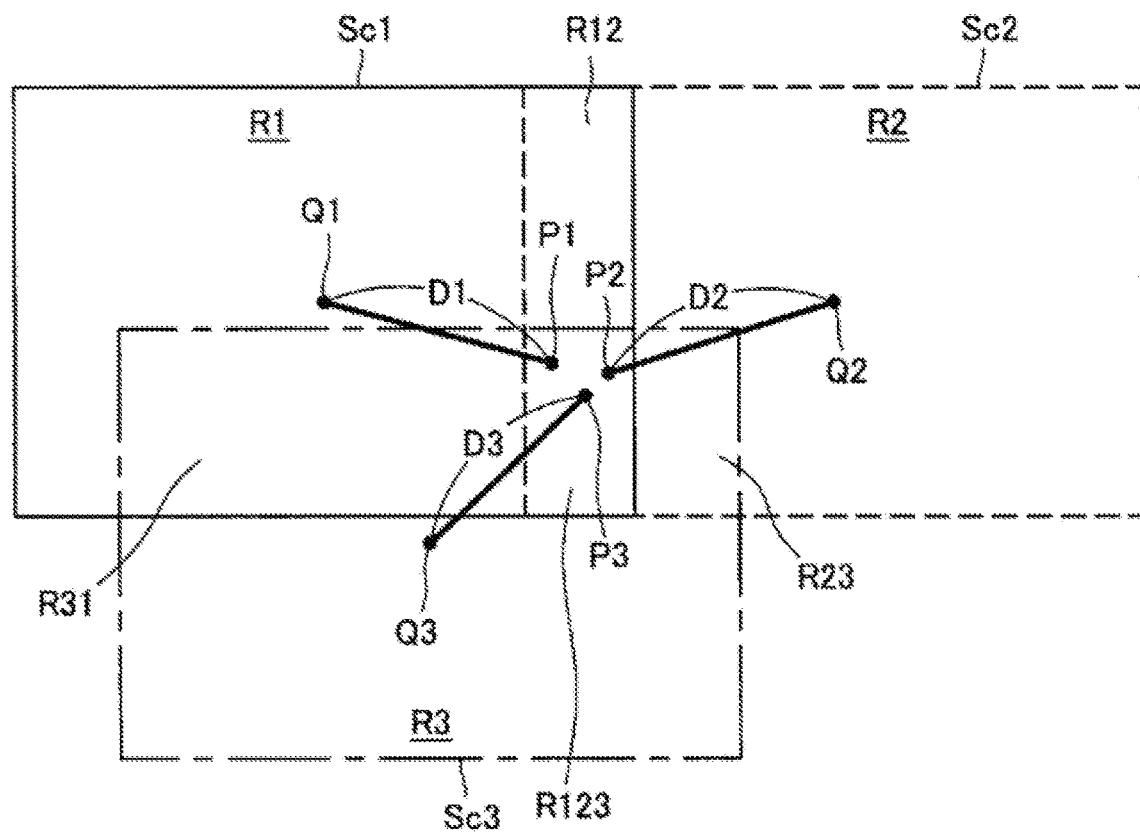

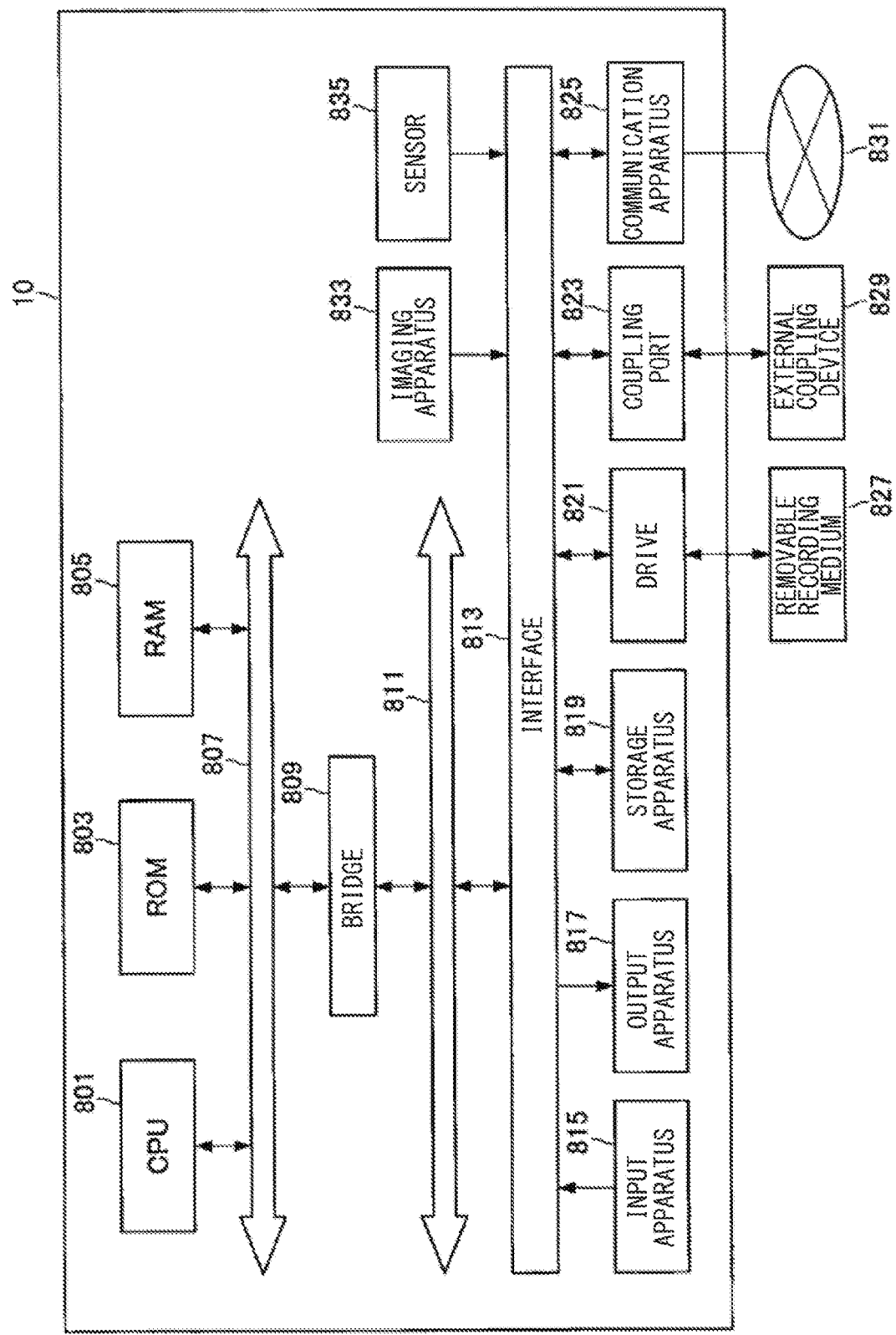
[FIG. 18]

INFORMATION PROCESSING APPARATUS, INFORMATION PROCESSING METHOD, AND PROGRAM FOR CONTROLLING INPUT POSITION IN AN OVERLAP REGION

CROSS REFERENCE TO PRIOR APPLICATION

This application is a National Stage Patent Application of PCT International Patent Application No. PCT/JP2019/035111 (filed on Sep. 6, 2019) under 35 U.S.C. § 371, which claims priority to Japanese Patent Application No. 2018-206266 (filed on Nov. 1, 2018), which are all hereby incorporated by reference in their entirety.

TECHNICAL FIELD

The present disclosure relates to an information processing apparatus, an information processing method, and a program.

BACKGROUND ART

In recent years, there has been known a system that displays an image on each of a plurality of display regions. For example, there is known a multi-projection system in which an image is projected onto a projection plane (a screen) from each of a plurality of projectors installed in space. In such a system, one display region may have a region that overlaps with another display region (hereinafter also referred to as an "overlap region"). Portions corresponding to the overlap region of a plurality of images are displayed on the overlap region, which easily causes blurring in display on the overlap region. Therefore, a technology has been proposed for reducing blurring that occurs in display on the overlap region.

For example, there is a system in which an image having been corrected with use of a geometric correction function is projected by a projector. For such a system, a technology has been disclosed for increasing a weight of a geometric correction function to be used for the overlap region more than a weight of a geometric correction function to be used for an region that does not overlap with another display region (hereinafter, also referred to as a "non-overlap region") of the one display region (for example, see PTL 1). According to such a technology, geometric consistency in an overlap region among respective images projected from a plurality of projectors is enhanced, which makes it possible to reduce blurring that occurs in display on the overlap region.

CITATION LIST

Patent Literature

PTL 1: Japanese Unexamined Patent Application Publication No. 2005-252676

SUMMARY OF THE INVENTION

Problems to be Solved by the Invention

However, a case is also assumed where the position of an image (a displayed image) in a plurality of display regions is changed. It is therefore desirable to provide a technology for enhancing quality of a displayed image in an overlap region among a plurality of display regions even in a case where the position of the displayed image is changed.

Means for Solving the Problems

According to the present disclosure, there is provided an information processing apparatus including: a display controller that controls display of a displayed image in at least one display region of a plurality of display regions on the basis of an input position detected on the basis of a captured image, in which the plurality of display regions includes a first display region and a second display region, and in a case where the input position has moved to an overlap region where the first display region and the second display region overlap with each other, the display controller controls display of the displayed image in the overlap region on the basis of the input position before moving the overlap region.

According to the present disclosure, there is provided an information processing method including: controlling display of a displayed image in at least one display region of a plurality of display regions on the basis of an input position detected on the basis of a captured image, in which the plurality of display region includes a first display region and a second display region, and the information processing method including, in a case where the input position has moved to an overlap region where the first display region and the second display region overlap with each other, controlling display of the displayed image in the overlap region on the basis of the input position before moving the overlap region.

According to the present disclosure, there is provided a program causing a computer to function as an information processing apparatus, the information processing apparatus including: a display controller that controls display of a displayed image in at least one display region of a plurality of display regions on the basis of an input position detected on the basis of a captured image, in which the plurality of display regions includes a first display region and a second display region, and in a case where the input position has moved to an overlap region where the first display region and the second display region overlap with each other, the display controller controls display of the displayed image in the overlap region on the basis of the input position before moving the overlap region.

BRIEF DESCRIPTION OF DRAWINGS

FIG. 1 is a diagram illustrating an example in which portions of screens onto which a plurality of projectors each projects an image overlap with each other.

FIG. 2 is a diagram illustrating an example in a case where input to an overlap region is performed.

FIG. 3 is a schematic configuration diagram of an information processing system according to an embodiment of the present disclosure.

FIG. 4 is a diagram illustrating an achieved image of the information processing system according to the embodiment of the present disclosure.

FIG. 5 is a diagram illustrating a functional configuration example of the information processing system according to the embodiment of the present disclosure.

FIG. 6 is a diagram that describes a case where a displayed image is projected from each projector even in a case where an input position is present in an overlap region.

FIG. 7 is a diagram that describes a case where, in a case where an input position has moved to an overlap region, FIG. 8 is a diagram that describes a case where a start point of the input position is present inside an overlap region.

FIG. 9 is a diagram that describes a first example of combination of input positions.

FIG. 10 is a diagram illustrating change of a position after combination of input positions.

FIG. 11 is a diagram that describes a second example of combination of input positions.

FIG. 12 is a diagram that describes a third example of combination of input positions.

FIG. 13 is a diagram illustrating a projection example of a displayed image onto a position (a projection position) after combination.

FIG. 14 is a flowchart illustrating an operation example of an information processing apparatus according to an embodiment of the present disclosure.

FIG. 15 is a flowchart illustrating an operation example of the information processing apparatus according to the embodiment of the present disclosure.

FIG. 16 is a diagram illustrating an example in a case where there are three screens.

FIG. 17 is a diagram that describes an example of combination of three input positions.

FIG. 18 is a block diagram illustrating a hardware configuration example of the information processing system according to the embodiment of the present disclosure.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference signs.

Further, in the present specification and drawings, a plurality of components having substantially the same functional configuration are distinguished by adding different numbers to the ends of the same reference signs in some cases. It is to be noted that only the same reference sign is assigned to a plurality of components having substantially the same functional configuration in a case where there is no particular need to distinguish them. In addition, a plurality of components having the same or similar functional configuration are distinguished by adding different alphabet characters to the ends of the same reference signs in some cases. It is to be noted that only the same reference sign is assigned to a plurality of components having the same or similar functional configuration in a case where there is no particular need to distinguish them.

It is to be noted that description is given in the following order.

0. Overview
1. Details of Embodiment
1.1. System Configuration Example
1.2. Display Control in Overlap Region
1.3. Operation Example
1.4. Various Modification Examples
1.5. Effects
1.6. Hardware Configuration Example
2. Conclusion

0. OVERVIEW

In recent years, there has been known a system that displays an image on each of a plurality of display regions. Displaying an image on each of a plurality of display regions makes it possible to display an image in a wider range. On each of the plurality of display regions, an image is displayed by a display apparatus corresponding to each of the display regions.

In an embodiment of the present disclosure, a projector as one form of the display apparatus is described as an example. In a case where the projector is used as the display apparatus, a screen (a projection region) onto which the projector projects an image may correspond to a display region. In addition, a position (a projection position) onto which the projector projects an image may correspond to a display position. In the embodiment of the present disclosure, a fixed projector is described as an example of the projector. However, a movable projector may be used as the projector. It is to be noted that the form of the display apparatus is not limited, and any other display (e.g., a television set or the like) may be used as the display apparatus.

The projector is able to change a display size of an image in accordance with a distance (a projection distance) from the projector to the screen. The projector is therefore a device that is able to relatively easily display a large image (a large screen) even in restricted space such as indoors by adjusting the projection distance. In recent years, a multi-projection system that projects a larger image (a large screen) has been put into practical use by arranging a plurality of projectors side by side.

In addition, an interactive projector that is able to perform an input operation on an image (displayed contents) projected by a projector with a pen type device (a pen type input apparatus) has been put into practical use. For example, there is a pen type device in which an infrared LED (IR Light emitting Diode) mounted on a pen tip illuminates in a case where the pen tip is pressed against a projection plane. The interactive projector may use a technique of capturing an image of an infrared LED illuminating in this way by a camera provided with a visible light cut filter or the like that allows only infrared light to pass therethrough, and detecting an input position on the basis of a position of the infrared LED recognized from the captured image.

Alternatively, the interactive projector may use a technique of detecting an input position from a pattern projected by a projector. In the embodiment of the present disclosure, description is given, as an example, of a pen type device (a pen type input apparatus) including an infrared LED as an operation body that performs an input operation. However, the operation body is not limited to the pen type device including the infrared LED. For example, the operation body may be a pen type device (a pen type input apparatus) including a visible light LED in place of the infrared LED. The visible light LED may be a single color LED (such as red or blue), or a full-color LED.

Alternatively, the operation body is not limited to the pen type device. That is, it is sufficient if a position pointed by any operation body that is recognized from an image captured by a camera is detected as an input position. For example, in a case where a finger is used as an operation body, a position pointed by the finger that is recognized from an image captured by a camera may be detected as an input position.

In a case where the position of a pen tip is detected from an image captured by a camera, an input position in a screen (a projection plane) is calculated by transforming a position (camera coordinates) of the pen tip in the image into a position (screen coordinates) in a screen projected by a projector. A correspondence relationship between the camera coordinates and the screen coordinates is obtained by calibration as described later. That is, transformation from the camera coordinates into the screen coordinates may be performed in accordance with such a correspondence relationship between the camera coordinates and the screen coordinates.

To create a seamless screen by projecting an image from each of a plurality of projectors, adjustment of physical installation positions of the plurality of projectors and calibration are necessary. However, ideal installation of the plurality of projectors for creating a seamless screen is not always possible, particularly in indoors where there are spatial limitations. The following description is given of difficulty in creating a seamless screen by projecting an image from each of the plurality of projectors.

FIG. 1 is a diagram illustrating an example in which portions of screens onto which a plurality of projectors each projects an image overlap with each other. With reference to FIG. 1, a projector 410 and a projector 420 are installed in space. In addition, there are a screen Sc onto which the projector 410 projects an image and a screen Sc2 onto which the projector 420 projects an image. The screen Sc1 and the screen Sc2 overlap with each other in respective portions thereof (an overlap region). In the embodiment of the present disclosure, a case is mainly assumed where there are two screens, and projectors that each project an image are provided one for each of the two screens. However, the number of screens may be three or more, and the number of projectors may be changed in accordance with the number of screens.

FIG. 2 is a diagram illustrating an example in a case where input to the overlap region is performed. With reference to FIG. 2, a camera 310 and a camera 320 are installed in space in addition to the projector 410 and the projector 420. The camera 310 captures an image of the screen Sc1 onto which the projector 410 projects an image. In addition, the camera 320 captures an image of the screen Sc2 onto which the projector 420 projects an image.

It is to be noted that in the present embodiment, a case is assumed where cameras that each capture an image of a corresponding one of the screen Sc1 and the screen Sc2 are separately present. However, the same camera may capture an image of each of the screen Sc1 and the screen Sc2. In such a case, it is sufficient if an image of the screen Sc1 is captured in a first imaging region of an image captured by one camera and an image of the screen Sc2 is captured in a second imaging region. In addition, a pen type input apparatus 200 to be used by a user is present in space.

A correspondence relationship between an input position in an image captured by the camera 310 (hereinafter also referred to as an "input position in the camera 310") and an input position in the screen Sc1 onto which the projector 410 projects an image (hereinafter also referred to as an "input position in the screen Sc1") is obtained by calibration. Transformation from the input position in the camera 310 into the input position in the screen Sc may be performed on the basis of the correspondence relationship between the input position in the camera 310 and the input position in the screen Sc1. The transformation from the input position in the camera 310 into the input position in the screen Sc1 may be projection transformation.

In addition, a correspondence relationship between an input position in an image captured by the camera 320 (hereinafter also referred to as an "input position in the camera 320") and an input position in the screen Sc2 onto which the projector 420 projects an image (hereinafter also referred to as an "input position in the screen Sc2") is also obtained by calibration. Transformation from the input position in the camera 320 into the input position in the screen Sc2 may be performed on the basis of the correspondence relationship between the input position in the camera 320 and the input position in the screen Sc2. The transformation from the input position in the camera 320 into the input position in the screen Sc2 may be projection transformation.

Here, a case is assumed where upon detection of the input position in the camera 310, the input position in the camera 310 is transformed into the input position in the screen Sc1 and the projector 410 projects an image (writing) onto the input position in the screen Sc1. Similarly, a case is assumed where upon detection of the input position in the camera 320, the input position in the camera 320 is transformed into the input position in the screen Sc2 and the projector 420 projects an image (writing) onto the input position in the screen Sc2. Each of the projectors 410 and 420 projects an image (writing) onto an overlap region between the screen Sc and the screen Sc2.

At this time, as illustrated in FIG. 2, a case is assumed where a user changes the input position from the screen Sc2 to the screen Sc (where the input apparatus 200 is moved). In such a case, the input position in the overlap region between the screen Sc2 and the screen Sc1 is detected as the input position in the camera 320 and the input position in the camera 310, the input position in the camera 320 is transformed into the input position in the screen Sc2, and the input position in the camera 310 is transformed into the input position in the screen Sc1.

At this time, there may be a case where displacement occurs in a physical installation position or an installation direction of at least one of the camera 310 and the camera 320. As an example, a case is assumed where the physical installation position of at least one of the camera 310 and the camera 320 is displaced from a result of calibration relating to the installation position and the installation direction of that camera in space. In such a case, displacement may occur in a position in space corresponding to each of the input position in the camera 310 and the input position in the camera 320. At this time, displacement may occur also in a position in space corresponding to each of a projection position in the screen Sc and a projection position in the screen Sc2.

Alternatively, displacement may occur in a physical installation position or an installation direction of at least one of the projector 410 and the projector 420. As an example, a case is assumed where the physical installation position of at least one of the projector 410 and the projector 420 is displaced from a result of calibration relating to the installation position and the installation direction of that projector in space. In such a case, displacement may occur in a position in space corresponding to each of the projection position in the screen Sc1 and the projection position in the screen Sc2.

Alternatively, a case is assumed where a position after transformation differs between transformation from the input position in the camera 310 into the input position in the screen Sc1 and transformation from the input position in the camera 320 into the input position in the screen Sc2. In such a case, even in a case where displacement does not occur in a position in space corresponding to each of the input position in the camera 310 and the input position in the camera 320, displacement may occur in a position in space corresponding to each of the input position in the screen Sc1 and the input position in the screen Sc2. At this time, displacement may occur also in a position in space corresponding to each of the projection position in the screen Sc and the projection position in the screen Sc2.

As described above, the projector 410 and the projector 420 each project an image (writing) onto the overlap region between the screen Sc and the screen Sc2. However, as described above, displacement may occur in a position in space corresponding to each of the projection position in the screen Sc and the projection position in the screen Sc2. Accordingly, as illustrated in FIG. 2, displacement may occur between the projection position (writing Tr1) in the screen Sc and the projection position (writing Tr2) in the screen Sc2 in the overlap region between the screen Sc1 and the screen Sc2.

The embodiment of the present disclosure mainly proposes a technology for enhancing quality of a displayed image in the overlap region between the screen Sc1 and the screen Sc2 even in a case where the position of the image (the displayed image) is changed in such a manner. As an example, in a case where the input position has moved to the overlap region, an information processing apparatus 100 gives priority to projection by a projector that projects one screen where the input position is present before moving to the overlap region. This makes it possible to prevent occurrence of displacement in display of an image. In addition, as another example, the information processing apparatus 100 performs correction of the input position in a case where the input position moves in the overlap region. This makes it possible to prevent occurrence of displacement in display of the image when the input position moves from the overlap region to another screen.

1. DETAILS OF EMBODIMENT

1.1. System Configuration Example

Next, description is given of a configuration example of an information processing system 10 according to an embodiment of the present disclosure with reference to FIG. 3. FIG. 3 is a schematic configuration diagram of the information processing system 10 according to the embodiment of the present disclosure. As illustrated in FIG. 3, the information processing system 10 includes the information processing apparatus 100, an input apparatus 200, the camera 310, the camera 320, and the projector 410 and the projector 420 as examples of an output apparatus. In the example illustrated in FIG. 3, the camera 310, the camera 320, the projector 410, and the projector 420 are installed on a ceiling surface, but positions where the camera 310, the camera 320, the projector 410, and the projector 420 are installed are not limited.

The camera 310, the camera 320, the projector 410, and the projector 420 are coupled to the information processing apparatus 100. In addition, with reference to FIG. 3, the screen Sc onto which the projector 410 projects an image and the screen Sc2 onto which the projector 420 projects an image are present in space. The positions where the screen Sc and the screen Sc2 are provided are also not limited. An image of the screen Sc1 is captured by the camera 310. In addition, an image of the screen Sc2 is captured by the camera 320. A distance between the camera 310 and the projector 410 is not limited. Similarly, a distance between the camera 320 and the projector 420 is also not limited. As described above, the number of cameras is not limited as long as the number of cameras is one or more, and the number of projectors is not limited as long as the number of projectors is two or more.

The input apparatus 200 includes an infrared LED (IR LED) 230 as an example of a light emitting section to be used for detection of an input position (writing). In addition, the input apparatus 200 includes a pen-tip switch 240 as an example of a detector that detects an input state. In the embodiment of the present disclosure, description is given mainly of a case where the pen-tip switch 240 is used as an example of the detector. However, the detector is not limited to the example. For example, the detector may include a pressure sensor, an electromagnetic induction type sensor, or an electrostatic capacitance type sensor. For example, in a case where a pressure sensor is used as the detector, not only writing by a pen but also a writing pressure by the pen may be obtained.

In addition, the input apparatus 200 includes a CPU (Central Processing Unit) 220 as an example of a controller that controls an overall operation of the input apparatus 200, and a communication module 210 as an example of a communication section that performs communication with the information processing apparatus 100. The communication section may transmit an ID (a pen ID) of the input apparatus 200 to the information processing apparatus 100. As a communication method by the communication section, Bluetooth (registered trademark), Wi-Fi (registered trademark), Zigbee (registered trademark), infrared communication, or ultrasonic communication may be used.

FIG. 4 is a diagram illustrating an achieved image of the information processing system 10 according to the embodiment of the present disclosure. As illustrated in FIG. 4, the screen Sc1 and the screen Sc2 are present in space. Further, the camera 310, the projector 410, the camera 320, and the projector 420 are present in space.

The camera 310 captures an image of the screen Scd, and then transmits the captured image of the screen Sc to the information processing apparatus 100. In a case where the information processing apparatus 100 detects an input position (an input position in the camera 310) from the captured image of the screen Sc1, the information processing apparatus 100 transmits a displayed image (writing) corresponding to the input position in the camera 310 to the projector 410. The projector 410 projects the displayed image (writing) onto the screen Sc1. It is to be noted that in a case where the projector 410 receives an image independent of the input position in the camera 310 from the information processing apparatus 100, the projector 410 may further project the image onto the screen Sc1.

The camera 320 captures an image of the screen Sc2, and then transmits the captured image of the screen Sc2 to the information processing apparatus 100. In a case where the information processing apparatus 100 detects an input position (an input position in the camera 320) from the captured image of the screen Sc2, the information processing apparatus 100 transmits a displayed image (writing) corresponding to the input position in the camera 320 to the projector 420. The projector 420 projects the displayed image (writing) onto the screen Sc2. It is to be noted that in a case where the projector 420 receives an image independent of the input position in the camera 320 from the information processing apparatus 100, the projector 420 may further project the image onto the screen Sc2.

The screen Sc1 and the screen Sc2 overlap with each other in respective portions thereof (an overlap region). This makes it possible to treat an image projected onto the screen Sc1 and an image projected onto the screen Sc2 as one large screen. With reference to FIG. 4, the position (the input position) of the input apparatus 200 moves from a region not overlapping with the screen Sc2 (a non-overlap region) of the screen Sc1 to a region not overlapping with the screen Sc (a non-overlap region) of the screen Sc2 via the overlap region. In the embodiment of the present disclosure, description is given of a technology for reducing, even in a case % where the input position moves over the regions, a possibility that displayed images (writing) are not smoothly linked with each other before and after the input position moves over the regions as illustrated in FIG. 4.

FIG. 5 is a diagram illustrating a functional configuration example of the information processing system 10 according to the embodiment of the present disclosure. As illustrated in FIG. 5, the information processing system 10 includes the information processing apparatus 100, the input apparatus 200, a sensor section 300, and a display section 400. The sensor section 300 includes the camera 310 and the camera 320. In addition, the display section 400 includes the projector 410 and the projector 420. The information processing apparatus 100 includes an I/F section 110, an input position detector 121, a controller 130, and a storage section 140.

The I/F section 110 may function as a communication module that performs communication with the input apparatus 200. In addition, the I/F section 110 functions as a communication module that receives a captured image detected by each of the camera 310 and the camera 320, and also functions as a communication module that transmits a displayed image to be displayed by the display section 400. It is to be noted that in the embodiment of the present disclosure, a case is assumed where the I/F section 110 performs wireless communication between respective apparatuses. However, the I/F section 110 may perform wired communication between respective apparatuses.

The input position detector 121 detects the input position in the camera 310 from an image (a captured image) captured by the camera 310. For example, in a case where the input apparatus 200 causes an IR LED to emit light, the input position detector 121 detects the input position in the camera 310 by recognizing a bright spot of the IR LED from an image (e.g., an infrared image) captured by the camera 310. It is to be noted that the input position in the camera 310 may be detected by the camera 310 in place of the information processing apparatus 100. Similarly, the input position detector 121 detects the input position in the camera 320 from an image (a captured image) captured by the camera 320.

The controller 130 includes a transformation parameter calculating section 131, an input position calculating section 132, a screen relationship calculating section 133, and a display controller 134. It is to be noted that the input position detector 121 and the controller 130 may each include, for example, a processor such as a CPU (Central Processing Unit). In case where such a controller includes a processor such as a CPU, the processor may include an electronic circuit.

The transformation parameter calculating section 131 calculates a correspondence relationship between camera coordinates and screen coordinates. Specifically, the transformation parameter calculating section 131 calculates a parameter (a first transformation parameter) for transforming the input position in the camera 310 into the input position in the screen Sc1. Herein, the first transformation parameter may be calculated in any way.

For example, in a case where a user performs input to a known position in the screen Sc and an input position is detected from a captured image by the camera 310, the transformation parameter calculating section 131 may calculate a transformation parameter on the basis of the known position in the screen Sc and the input position in the camera 310. Alternatively, in a case where the projector 410 projects a gray code or a specified pattern onto a known position in the screen Sc1, the position of the gray code or the specified pattern detected from a captured image by the camera 310 may be used in place of the input position in the camera 310. Similarly, the transformation parameter calculating section 131 calculates a parameter (a second transformation parameter) for transforming the input position in the camera 320 into the input position in the screen Sc2.

The input position calculating section 132 uses the first transformation parameter to transform the input position in the camera 310 into the input position in the screen Sc1. In addition, the input position calculating section 132 uses the second transformation parameter to transform the input position in the camera 320 into the input position in the screen Sc2. It is to be noted that in a case where distortion of a screen or the like occurs by influences of the installation position of the projector 410, the shape of a wall surface onto which the projector 410 projects an image, and the like, a geometrically corrected region may be treated as a screen.

The screen relationship calculating section 133 calculates a positional relationship between the screen Sc and the screen Sc2 (respective positions of the screen Sc1 and the screen Sc2 in space). The positional relationship between the screen Sc1 and the screen Sc2 may be calculated on the basis of a value measured when each device is installed. Alternatively, the positional relationship between the screen Sc1 and the screen Sc2 may be calculated on the basis of a positional relationship of the same image recognized from respective captured images by the camera 310 and the camera 320 (by matching processing). Alternatively, the positional relationship between the screen Sc1 and the screen Sc2 may be calculated on the basis of a correlation relationship of vectors indicating coordinate columns of input positions recognized from respective captured images by the camera 310 and the camera 320 (by matching processing).

In addition, an overlap relationship between the screen Sc and the screen Sc2 (that is, priority of each screen) may be set in advance. For example, information that the screen Sc1 is stacked above the screen Sc2 (i.e., the screen Sc1 has higher priority than the screen Sc1) may be set in advance.

The display controller 134 controls projection of a displayed image (writing) in at least one of the screen Sc and the screen Sc2 on the basis of an input position detected on the basis of an image captured by the sensor section 300. More specifically, in a case where the input position is detected in at least one of the screen Sc and the screen Sc2, the display controller 134 controls projection of a displayed image (writing) in at least one of the screen Sc1 and the screen Sc2 on the basis of the input position.

In addition, the display controller 134 determines which region of the screen Sc and the screen Sc2 the input position is present in. Specifically, in a case where the input position in the screen Sc1 is calculated, the display controller 134 determines which one of the non-overlap region with the screen Sc2 of the screen Sc and the overlap region with the screen Sc2 of the screen Sc1 the input position is present in, on the basis of the input position in the screen Sc1.

It is to be noted that the display controller 134 may perform similar determination on the basis of the input position in the camera 310 in place of the input position in the screen Sc1. That is, the display controller 134 may determine which region of an imaging region corresponding to the non-overlap region with the screen Sc2 of the screen Sc1 and an imaging region corresponding to the overlap region with the screen Sc2 of the screen Sc the input position is present in, on the basis of the input position in the camera 310.

Similarly, in a case where the input position in the screen Sc2 is calculated, the display controller 134 determines which one of the non-overlap region with the screen Sc1 of the screen Sc2 and the overlap region with the screen Sc of the screen Sc2 the input position is present in, on the basis of the input position in the screen Sc2.

In a case where the input position is determined to be present in the non-overlap region with the screen Sc2 of the screen Sc1, the display controller 134 controls the projector 410 to project a displayed image onto a projection position corresponding to the input position in the screen Sc1. The projection position corresponding to the input position in the screen Sc may be the same position as the input position in the screen Sc1, or may be a position displaced by a predetermined distance from the input position in the screen Sc1 in a predetermined direction.

Similarly, in a case where the input position is determined to be present in the non-overlap region with the screen Sc1 of the screen Sc2, the display controller 134 controls the projector 420 to project a displayed image onto a projection position corresponding to the input position in the screen Sc2.

Meanwhile, cases are also assumed where the display controller 134 determines that the input position is present in the overlap region with the screen Sc2 of the screen Sc1 on the basis of the input position in the screen Sc1 and where the display controller 134 determines that the input position is present in the overlap region with the screen Sc1 of the screen Sc2 on the basis of the input position in the screen Sc2. In these cases, a desirable way of controlling projection of the displayed image by the display controller 134 is described in detail later.

The storage section 140 includes a memory, and is a storage medium that stores a program to be executed by the controller 130 and stores data necessary for execution of a program. In addition, the storage section 140 temporarily stores data for computation by the controller 130. For example, the storage section 140 includes a magnetic storage device, a semiconductor storage device, an optical storage device, or a magneto-optical storage device.

The description has been given above of the configuration example of the information processing system 10 according to the embodiment of the present disclosure.

1.2. Display Control in Overlap Region

Next, description is given of a display control example of a displayed image in an overlap region.

FIG. 6 is a diagram that describes a case where a displayed image is projected from each projector even in a case where the input position is present in an overlap region. With reference to FIG. 6, a non-overlap region R1 with the screen Sc2 of the screen Sc that is present in space is illustrated. In addition, an overlap region R12 between the screen Sc and the screen Sc2 that is present in space is illustrated. Further, a non-overlap region R2 with the screen Sc of the screen Sc2 that is present in space is illustrated.

As illustrated in FIG. 6, a case is assumed where input by a user starts, and the display controller 134 determines that the input position is present in the non-overlap region R1 with the screen Sc2 of the screen Sc1 on the basis of the input position in the screen Sc1. In such a case, the display controller 134 controls the projector 410 to start projection of a displayed image (a trail Tr1-1) onto a projection position corresponding to the input position in the screen Sc1. Then, a case is assumed where the display controller 134 determines that the input position has moved to the overlap region R12 with the screen Sc2 of the screen Sc on the basis of the input position in the screen Sc1. In such a case, the display controller 134 controls the projector 410 to continue projecting the displayed image (the trail Tr1-1) onto the projection position corresponding to the input position in the screen Sc1.

At this time, a case is assumed where the display controller 134 determines that the input position is present in the overlap region R12 with the screen Sc of the screen Sc2 on the basis of the input position in the screen Sc2. In such a case, the display controller 134 controls the projector 420 to start projection of a displayed image (a trail Tr2) onto a projection position corresponding to the input position in the screen Sc2.

In such a case, as described above, displacement may occur in a position in space corresponding to each of the projection position in the screen Sc1 and the projection position in the screen Sc2. Accordingly, with reference to FIG. 6, in the overlap region R12 between the screen Sc1 and the screen Sc2, displacement occurs between the projection position (the writing Tr1) in the screen Sc and the projection position (the writing Tr2) in the screen Sc2.

Accordingly, in the embodiment of the present disclosure, in a case where the input position has moved to the overlap region R12 between the screen Sc and the screen Sc2, the display controller 134 controls projection of a displayed image in the overlap region R12 on the basis of the input position before moving to the overlap region. Such a configuration makes it possible to enhance quality of the displayed image in the overlap region R12 even in a case where the position of the displayed image is changed.

More specifically, it is desirable that the display controller 134 control projection of the displayed image in the overlap region R12 on the basis of from which one of the non-overlap region R1 with the screen Sc2 of the screen Sc and the non-overlap region R2 with the screen Sc of the screen Sc2 the input position has moved to the overlap region R12 on the basis of the input position in the screen Sc and the input position in the screen Sc2. This reduces a possibility that respective displayed images projected from the projector 410 and the projector 420 onto the overlap region R12 are displayed while being displaced.

More specifically, it is desirable that the display controller 134 give priority to projection of a displayed image from a projector corresponding to a non-overlap region where the input position has been present before moving to the overlap region R12. This reduces a possibility that displayed images from both the projector 410 and the projector 420 are projected onto the overlap region R12 while being displaced, and reduces a possibility that the displayed images are not smoothly linked with each other at least before and after the input position moves to the overlap region R12. Such an example is described in detail below.

FIG. 7 is a diagram that describes a case where, in a case where the input position has moved to an overlap region, high priority is given to projection of a displayed image from a projector corresponding to a non-overlap region before such movement.

Even in an example illustrated in FIG. 7, as in the example illustrated in FIG. 6, a case is assumed where input by a user starts, and the display controller 134 determines that the input position is present in the non-overlap region R1 with the screen Sc2 of the screen Sc1 on the basis of the input position in the screen Sc1. In such a case, the display controller 134 controls the projector 410 to start projection of a displayed image (the trail Tr1-1) onto a projection position corresponding to the input position in the screen Sc1. Then, as in the example illustrated in FIG. 6, a case is assumed where the display controller 134 determines that the input position has moved to the overlap region R12 with the screen Sc2 of the screen Sc on the basis of the input position in the screen Sc1.

In such a case, the display controller 134 gives higher priority to projection of the displayed image (the trail Tr1-1) onto the screen Sc from the projector 410 corresponding to the non-overlap region R1 where the input position has been present before moving to the overlap region R12 than to projection of a displayed image from the projector 420 corresponding to the non-overlap region R2 where the input position has not been present before moving to the overlap region R12. This reduces the possibility that the displayed images from both the projector 410 and the projector 420 are projected onto the overlap region R12 while being displaced, and reduces the possibility that the displayed images are not smoothly linked with each other at least before and after the input position moves to the overlap region R12.

Thereafter, a case is assumed where the input position has moved from the overlap region R12 to the non-overlap region R2. At this time, the input position in the screen Sc is not calculated, but the input position in the screen Sc2 is calculated. Accordingly, the display controller 134 controls the projector 420 to project the displayed image (the trail Tr2) onto a projection position corresponding to the input position in the screen Sc2 on the basis of the input position in the screen Sc2.

Further, a case is assumed where the input position has moved from the non-overlap region R2 to the overlap region R12. Even in such a case, the display controller 134 determines that the input position has moved to the overlap region with the screen Sc1 of the screen Sc2 on the basis of the input position in the screen Sc2. Then, the display controller 134 gives higher priority to projection of the displayed image (the trail Tr2) from the projector 420 corresponding to the non-overlap region R2 where the input position has been present before moving to the overlap region R12 than to projection of the displayed image from the projector 410 corresponding to the non-overlap region R1 where the input position has not been present before moving to the overlap region R12.

This reduces the possibility that the displayed images from both the projectors 410 and the projector 420 are projected onto the overlap region R12 while being displaced, and reduces the possibility that the displayed images are not smoothly linked with each other at least before and after the input position moves to the overlap region R12. Further, giving higher priority to projection of the displayed image (the trail Tr2) from the projector 420 corresponding to the non-overlap region R2 where the input position has been present before moving to the overlap region R12 makes it possible to reduce a possibility that switching of a projector that projects an image frequently occurs, even in a case w % here the input position moves back and forth between the overlap region R12 and the non-overlap region.

FIG. 8 is a diagram that describes a case where a start point of the input position is present inside the overlap region R12. As illustrated in FIG. 8, it is assumed that an input position P1 is calculated as a start point of the input position in the screen Sc1. Meanwhile, it is assumed that an input position P2 is calculated as a start point of the input position in the screen Sc2. At this time, the display controller 134 calculates a distance D1 from the start point (the input position P1) of the input position in the screen Sc to a boundary between the non-overlap region R1 and the overlap region R12, and calculates a distance D2 from the start point (the input position P2) of the input position in the screen Sc2 to a boundary between the non-overlap region R2 and the overlap region R12.

Then, as illustrated in FIG. 8, in a case where the distance D1 is smaller than the distance D2, it is conceivable that a possibility of moving to the non-overlap region R1 afterward is higher than a possibility of moving to the non-overlap region R2. Accordingly, in such a case, it is desirable that the display controller 134 give higher priority to projection of an image from the projector 410 corresponding to the screen Sc than to projection of an image from the projector 420 corresponding to the screen Sc2.

In contrast, in a case where the distance D2 is smaller than the distance D1, it is conceivable that the possibility of moving to the non-overlap region R2 afterward is higher than the possibility of moving to the non-overlap region R1. Accordingly, in such a case, it is desirable that the display controller 134 give higher priority to projection of an image from the projector 420 corresponding to the screen Sc2 than to projection of an image from the projector 410 corresponding to the screen Sc1.

Further, a case is assumed where the distance D1 and the distance D2 are equal to each other. In such a case, it is conceivable that the possibility of moving to the non-overlap region R2 afterward is the same as the possibility of moving to the non-overlap region R1. Accordingly, in such a case, it is desirable that the display controller 134 give higher priority to projection of an image from a projector corresponding to a screen having higher priority than to projection of an image from a projector corresponding to a screen having lower priority.

It is to be noted that with reference to FIG. 8, high priority is given to projection of the displayed image (the trail Tr1-1) from the projector 410 corresponding to the non-overlap region R1 where the input position has been present before moving to the overlap region R12. As illustrated in FIG. 8, this makes it possible to reduce the possibility that switching of a projector that projects an image frequently occurs, even in a case where the input position moves back and forth between the overlap region R12 and the non-overlap region R1.

Here, with reference to FIG. 7 and FIG. 8, there is a case where the input position moves from the overlap region R12 to the non-overlap region R2. In such a case, the display controller 134 gives higher priority to projection of the displayed image (the trail Tr2) onto the screen Sc2 from the projector 420 corresponding to the non-overlap region R2 where the input position is present after moving from the overlap region R12 than to projection of a displayed image from the projector 410 corresponding to the non-overlap region R1 where the input position is not present after moving from the overlap region R12. However, as illustrated in FIG. 7 and FIG. 8, there is a possibility that the displayed images before and after the input position moves from the overlap region R12 to the non-overlap region R2 are not smoothly liked with each other.

The display controller 134 therefore reduces the possibility that the displayed images before and after the input position moves from the overlap region R12 to the non-overlap region R2 are not smoothly liked with each other. Specifically, in a case where the input position in the screen Sc1 moves inside the overlap region R12 after moving from the non-overlap region R1 to the overlap region R12, the display controller 134 combines the input position in the screen Sc1 and the input position in the screen Sc2 (corrects the input position in the screen Sc with use of the input position in the screen Sc2). Then, the display controller 134 performs control to project a displayed image by the projector 410 on the basis of a position after combination (e.g., onto the position after combination).

Combination of the input position in the screen Sc1 and the input position in the screen Sc2 may be performed by any method. For example, the input position in the screen Sc1 and the input position in the screen Sc2 may be combined by addition of a result obtained by performing first weighting on the input position in the screen Sc (a result obtained by multiplying by a weight a1) and a result obtained by performing second weighting on the input position in the screen Sc2 (a result obtained by multiplying by a weight a2). The weight a1 and the weight a2 may be determined to sum to 1.

FIG. 9 is a diagram that describes a first example of combination of input positions. In the example illustrated in FIG. 9, a case is assumed where the input position in the screen Sc moves inside the overlap region R12 after moving from the non-overlap region R1 to the overlap region R12. At this time, it is assumed that at a certain point while the input position in the screen Sc1 is moving inside the overlap region R12, the input position in the screen Sc is calculated as P1, and the input position in the screen Sc2 is calculated as P2.

The display controller 134 may determine the weight a1 on the basis of a distance corresponding to the input position P1 in the screen Sc and a predetermined position in the screen Sc1. Alternatively, the display controller 134 may determine the weight a2 on the basis of a distance corresponding to the input position P2 in the screen Sc2 and a predetermined position in the screen Sc2. Alternatively, the display controller 134 may determine the weight a1 and the weight a2 on the basis of a ratio of the distance corresponding to the input position P1 in the screen Sc and the predetermined position in the screen Sc1 and the distance corresponding to the input position P2 in the screen Sc2 and the predetermined position in the screen Sc2.

In the example illustrated in FIG. 9, the predetermined position in the screen Sc is a boundary between the non-overlap region R1 and the overlap region R12 in the screen Sc1, and the distance D1 from the input position P1 in the screen Sc1 to the boundary is illustrated. It is sufficient if the display controller 134 increases the weight a1 with a decrease in the distance D1. By doing so, the closer to the non-overlap region R1 the input position P1 in the screen Sc is inside the overlap region R12, the more the weight on the input position P1 in the screen Sc is increased, which causes the position (the projection position) after combination to be smoothly changed, and increases a possibility that displayed images are smoothly linked with each other.

In addition, in the example illustrated in FIG. 9, the predetermined position in the screen Sc2 is a boundary between the non-overlap region R2 and the overlap region R12 in the screen Sc2, and the distance D2 from the input position in the screen Sc2 to the boundary is illustrated. It is sufficient if the display controller 134 increases the weight a2 with a decrease in the distance D2. By doing so, the closer to the non-overlap region R2 the input position P2 in the screen Sc2 is inside the overlap region R12, the more weight on the input position P2 in the screen Sc2 is increased, which causes the position (the projection position) after combination to be smoothly changed, and increases the possibility that displayed images are smoothly linked with each other.

It is to be noted that calculation of the position (the projection position) after combination may be performed by transforming the input position in the screen Sc1 and the input position in the screen Sc2 into spatial coordinate systems. That is, the display controller 134 transforms the input position P1 (x1, y1) in the screen Sc1 into a position H1(P1) in space with use of a transformation equation H1 obtained in advance. In addition, the display controller 134 transforms the input position P2 (x2, y2) in the screen Sc2 into a position H2(P2) in space with use of a transformation equation H2 obtained in advance. The display controller 134 calculates a position P (a projection position) after combination with use of the following equation (1).

$$P = a1/(a1+a2)*H1(P1) + a2/(a1+a2)*H2(P2)$$  Equation (1)

In addition, in the example illustrated in FIG. 9, the predetermined position in the screen Sc2 is a boundary between the overlap region R2 and the overlap region R12 in the screen Sc2, and the distance D2 from the input position P2 in the screen Sc2 to the boundary is illustrated. It is sufficient if the display controller 134 increases the weight a2 with a decrease in the distance D2. By doing so, the closer to the non-overlap region R2 the input position P2 in the screen Sc2 is inside the overlap region R12, the more the weight on the input position P2 in the screen Sc2 is increased, which causes the position (the projection position) after combination to be smoothly changed, and increases the possibility that displayed images are smoothly linked with each other.

FIG. 10 is a diagram illustrating change of a position after combination of input positions. FIG. 10 illustrates a case where the input position P1 in the screen Sc1 and the input position P2 in the screen Sc2 are present inside the overlap region R12. A position after combination is illustrated as P. In addition, a weight on the input position (the trail Tr1) in the screen Sc is illustrated as a1, and a weight on the input position (the trail Tr2) in the screen Sc2 is illustrated as a2.

With reference to FIG. 10, the closer to the non-overlap region R1 the input position P1 in the screen Sc1 is inside the overlap region R12, the more the weight a1 on the input position P1 in the screen Sc1 is increased (the closer to the non-overlap region R2 the input position P2 in the screen Sc2 is inside the overlap region R12, the more the weight a2 on the input position P2 in the screen Sc2 is increased). Accordingly, it is understood that the position P (a trail Tr12) after combination is smoothly changed, and the possibility that displayed images are smoothly linked with each other is increased.

FIG. 11 is a diagram that describes a second example of combination of input positions. Even in the example illustrated in FIG. 11, as in the example illustrated in FIG. 10, a case is assumed where the input position in the screen Sc moves inside the overlap region R12 after moving from the non-overlap region R1 to the overlap region R12. At this time, it is assumed that at a certain point while the input position in the screen Sc is moving inside the overlap region R12, the input position in the screen Sc1 is calculated as P1, and the input position in the screen Sc2 is calculated as P2.

In the example illustrated in FIG. 11, the predetermined position in the screen Sc1 is a boundary between the non-overlap region R1 and the overlap region R12 in the screen Sc1, and the distance D1 from a middle point between the input position P1 in the screen Sc1 and the input position P2 in the screen Sc2 to the boundary is illustrated.

It is sufficient if the display controller 134 increases the weight a1 with a decrease in the distance D1. By doing so, the closer to the non-overlap region R1 the input position P1 in the screen Sc1 is inside the overlap region R12, the more the weight on the input position P1 in the screen Sc is increased, which causes the position (the projection position) after combination to be smoothly changed, and increases the possibility that displayed images are smoothly linked with each other.

In addition, in the example illustrated in FIG. 1, the predetermined position in the screen Sc2 is a boundary between the non-overlap region R2 and the overlap region R12 in the screen Sc2, and the distance D2 from a middle point between the input position P1 in the screen Sc and the input position P2 in the screen Sc2 to the boundary is illustrated. It is sufficient if the display controller 134 increases the weight a2 with a decrease in the distance D2. By doing so, the closer to the non-overlap region R2 the input position P2 in the screen Sc2 is inside the overlap region R12, the more the weight on the input position P2 in the screen Sc2 is increased, which causes the position (the projection position) after combination to be smoothly changed, and increases the possibility that displayed images are smoothly linked with each other.

It is to be noted that calculation of the position (the projection position) after combination may be performed by transforming the input position P1 in the screen Sc1 and the input position P2 in the screen Sc2 into spatial coordinate systems. Details of calculation of the position (the projection position) after combination are as described above.

FIG. 12 is a diagram that describes a third example of combination of input positions. Even in the example illustrated in FIG. 12, as in the example illustrated in FIG. 10, a case is assumed where the input position in the screen Sc moves inside the overlap region R12 after moving from the non-overlap region R1 to the overlap region R12. At this time, it is assumed that at a certain point while the input position in the screen Sc is moving inside the overlap region R12, the input position in the screen Sc1 is calculated as P1, and the input position in the screen Sc2 is calculated as P2.

In the example illustrated in FIG. 12, the predetermined position in the screen Sc1 is a barycenter Q1 of the screen Sc1, and the distance D1 from the input position P1 in the screen Sc to the barycenter Q1 of the screen Sc1 is illustrated. It is sufficient if the display controller 134 increases the weight a1 with a decrease in the distance D1. By doing so, the closer to the non-overlap region R1 the input position P1 in the screen Sc is inside the overlap region R12, the more the weight on the input position P1 in the screen Sc is increased, which causes the position (the projection position) after combination to be smoothly changed, and increases the possibility that displayed images are smoothly linked with each other.

In addition, in the example illustrated in FIG. 12, the predetermined position in the screen is a barycenter Q2 of the screen Sc2, and the distance D2 from the input position P2 in the screen Sc2 to the barycenter Q2 of the screen Sc2 is illustrated. It is sufficient if the display controller 134 increases the weight a2 with a decrease in the distance D2. By doing so, the closer to the non-overlap region R2 the input position P2 in the screen Sc2 is inside the overlap region R12, the more the weight on the input position P2 in the screen Sc2 is increased, which causes the position (the projection position) after combination to be smoothly changed, and increases the possibility that displayed images are smoothly linked with each other.

It is to be noted that calculation of the position (the projection position) after combination may be performed by transforming the input position P1 in the screen Sc and the input position P2 in the screen Sc2 into spatial coordinate systems. Details of calculation of the position (the projection position) after combination are as described above.

FIG. 13 is a diagram illustrating a projection example of a displayed image onto the position (the projection position) after combination. With reference to FIG. 13, the input position moves from the non-overlap region R1 to the overlap region R12 (the trail Tr1-1), moves inside the overlap region R12, and moves to the non-overlap region R2 (the trail Tr2). Further, the input position moves from the non-overlap region R2 to the overlap region R12, moves inside the overlap region R12, and returns to the non-overlap region R1 (a trail Tr1-2). At this time, inside the overlap region R12, a displayed image (the trail Tr12) is projected onto the position after combination. Accordingly, it is understood that the displayed image (Tr12) in the overlap region R12 is smoothly linked with the displayed images (the trail Tr1-1 and the trail Tr1-2) in the non-overlap region R1 and the displayed image (the trail Tr2) in the non-overlap region R2.

The description has been given above of the display control example of the displayed image in the overlap region.

1.3. Operation Example

Next, description is given of an operation example of the information processing apparatus 100 according to the embodiment of the present disclosure.

FIG. 14 and FIG. 15 are flowcharts illustrating the operation example of the information processing apparatus 100 according to the embodiment of the present disclosure. As illustrated in FIG. 14, in the information processing apparatus 100, the input position detector 121 acquires camera images (an image captured by the camera 310 and an image captured by the camera 320) through the I/F section 110 (S11). The input position detector 121 detects an input position on the basis of the camera images (S12). More specifically, the input position detector 121 detects an input position in the camera 310 from the image captured by the camera 310, and detects an input position in the camera 320 from the image captured by the camera 320.

In a case where the transformation parameter calculating section 131 has already calculated transformation parameters (the first transformation parameter for transforming the input position in the camera 310 into the input position in the screen Sc1 and the second transformation parameter for transforming the input position in the camera 320 into the input position in the screen S2) ("Yes" in S13), the operation proceeds to S15. In contrast, in a case where the transformation parameter calculating section 131 has not yet calculated the transformation parameters ("No" in S13), the transformation parameters are calculated (S14) and the operation proceeds to S15.

The input position calculating section 132 calculates the input positions with use of the transformation parameters (S15). More specifically, the input position calculating section 132 transforms the input position in the camera 310 into the input position in the screen Sc1 with use of the first transformation parameter, and transforms the input position in the camera 320 into the input position in the screen Sc2 with use of the second transformation parameter. In a case where the input position calculating section 132 fails calculation of the input positions ("No" in S16), the operation returns to S11. In contrast, in a case where the input position calculating section 132 succeeds calculation of the input positions ("Yes" in S16), the operation proceeds to S21.

In a case where the screen relationship calculating section 133 has already calculated a screen relationship (a positional relationship between the screen Sc and the screen Sc2) ("Yes" in S21), the operation proceeds to S23. In contrast, in a case where the screen relationship calculating section 133 has not yet calculated the screen relationship ("No" in S21), the screen relationship calculation section 133 calculates the screen relationship (S22). The display controller 134 determines a display screen (a screen that performs display of an image on an overlap region) (S23), and controls the display section 400 to display an image corresponding to an input position in the display screen (S24). In a case where display is continued ("No" in S25), the display controller 134 returns to Sl1. In contrast, in a case where display is finished ("Yes" in S25), the display controller 134 finishes the display.

The description has been given above of the operation example of the information processing apparatus 100 according to the embodiment of the present disclosure.

1.4. Various Modification Examples

Here, description is given of various modification examples applicable to the present technology.

For example, in the above description, a case is mainly assumed where there are two screens, and projectors that each project an image are provided one for each of the two screens. However, the number of screens may be three or more, and the number of projectors may be changed in accordance with the number of screens.

FIG. 16 is a diagram illustrating an example in a case where there are three screens. With reference to FIG. 16, a screen Sc3 is present in space in addition to the screen Sc and the screen Sc2. In addition, in addition to the projector 410 that projects an image onto the screen Sc1 and the projector 420 that projects an image onto the screen Sc2, a projector 430 that projects an image onto the screen Sc3 is present in space.

In addition, with reference to FIG. 16, in addition of presence of the non-overlap region R1, the overlap region R12, and the non-overlap region R2, an overlap region R31 between the screen Sc3 and the screen Sc and an overlap region R23 between the screen Sc2 and the screen Sc3 are present. In addition, an overlap region R123 among the screen Sc1, the screen Sc2, and the screen Sc3 is present. Each of the overlap region R31 and the overlap region R23 may be treated similarly to the overlap region R12.

A relationship between the overlap region R123 in which respective portions of three screens overlap with one another and the overlap regions R12, R23, and R31 in which respective portions of two screens overlap with each other may be similar to the above-described relationship between the overlap region R12 in which respective portions of two screens overlap with each other and the non-overlap regions R1 and R2 that does not overlap with a portion of another screen.

FIG. 17 is a diagram that describes an example of combination of three input positions. In the example illustrated in FIG. 17, a case is assumed where the input position in the screen Sc1 moves inside the overlap region R123 after moving from the overlap region R12 to the overlap region R123. At this time, it is assumed that at a certain point while the input position in the screen Sc is moving inside the overlap region R123, the input position in the screen Sc is calculated as P1, the input position in the screen Sc2 is calculated as P2, and an input position in the screen Sc3 is calculated as P3.

In the example illustrated in FIG. 17, a predetermined position in the screen Sc is the barycenter Q1 of the screen Sc1, and the distance D1 from the input position P1 in the screen Sc to the barycenter Q1 of the screen Sc is illustrated. It is sufficient if the display controller 134 increases the weight a1 with a decrease in the distance D1. By doing so, the closer to the non-overlap region R1 the input position P1 in the screen Sc is inside the overlap region R123, the more the weight on the input position P1 in the screen Scd is increased, which causes the position (the projection position) after combination to be smoothly changed, and increases a possibility that displayed images are smoothly linked with one another.

In addition, in the example illustrated in FIG. 17, a predetermined position in the screen Sc2 is the barycenter Q2 of the screen Sc2, and the distance D2 from the input position P2 in the screen Sc2 to the barycenter Q2 of the screen Sc2 is illustrated. It is sufficient if the display controller 134 increases the weight a2 with a decrease in the distance D2. By doing so, the closer to the non-overlap region R2 the input position P2 in the screen Sc2 is inside the overlap region R123, the more the weight on the input position P2 in the screen Sc2 is increased, which causes the position (projection position) after combination to be smoothly changed, and increases the possibility that displayed images are smoothly linked with one another.

In addition, in the example illustrated in FIG. 17, a predetermined position in the screen Sc3 is a barycenter Q3 of the screen Sc3, and a distance D3 from the input position P3 in the screen Sc3 to the barycenter Q3 of the screen Sc3 is illustrated. It is sufficient if the display controller 134 increases a weight a3 with a decrease in the distance D3. By doing so, the closer to the non-overlap region R3 the input position P3 in the screen Sc3 is inside the overlap region R123, the more the weight on the input position P3 in the screen Sc3 is increased, which causes the position (projection position) after combination to be smoothly changed, and increases the possibility that displayed images are smoothly linked with one another.

It is to be noted that calculation of the position (the projection position) after combination may be performed by transforming the input position P1 in the screen Sc1, the input position P2 in the screen Sc2, and the input position P3 in the screen Sc3 into spatial coordinate systems.

That is, the display controller 134 transforms the input position P1 (x1, y1) in the screen Sc1 into the position H1(P1) in space with use of the transformation equation H1 obtained in advance. In addition, the display controller 134 transforms the input position P2 (x2, y2) in the screen Sc2 into the position H2(P2) in space with use of the transformation equation H2 obtained in advance. In addition, the display controller 134 transforms the input position P3 (x3, y3) in the screen Sc3 into a position H3(P3) in space with use of a transformation equation H3 obtained in advance. The display controller 134 calculates the position P (the projection position) after combination with use of the following equation (2).

$$P = a1/(a1+a2+a3)*H1(P1) + a2/(a1+a2+a3)*H2(P2) + a3/(a1+a2+a3)*H3(P3) \quad \text{Equation (2)}$$

The description has been given above of various modification examples applicable to the present technology.

1.5. Effects

Here, description is given of effects of the present technology.

In the embodiment of the present disclosure, in a case where the input position has moved to the overlap region, the information processing apparatus 100 gives priority to projection by a projector that projects one screen where the input position has been present before moving to the overlap region. This makes it possible to prevent occurrence of displacement in display of an image. In addition, as another example, in a case where the input position moves in the overlap region, the information processing apparatus 100 corrects the input position. This makes it possible to prevent occurrence of displacement in display of an image when the input position moves from the overlap region to another screen.

1.6. Hardware Configuration Example

Next, description is given of a hardware configuration of an information processing system 10 according to the embodiment of the present disclosure with reference to FIG. 18. FIG. 18 is a block diagram illustrating a hardware configuration example of the information processing system 10 according to the embodiment of the present disclosure.

As illustrated in FIG. 18, the information processing system 10 includes a CPU (Central Processing Unit) 801, a ROM (Read Only Memory) 803, and a RAM (Random Access Memory) 805. In addition, the information processing system 10 may include a host bus 807, a bridge 809, an external bus 811, an interface 813, a storage apparatus 819, a drive 821, a coupling port 823, and a communication apparatus 825. The information processing system 10 may include, in place of or in addition to the CPU 801, a processing circuit called a DSP (Digital Signal Processor) or an ASIC (Application Specific Integrated Circuit).

The CPU 801 functions as an arithmetic processing apparatus or a control apparatus, and controls an overall operation or a portion thereof in the information processing system 10 in accordance with various programs stored in the ROM 803, the RAM 805, the storage apparatus 819, or a removable recording medium 827. The ROM 803 stores programs to be used by the CPU 801, arithmetic parameters, and the like. The RAM 805 temporarily stores programs to be used in execution by the CPU 801, parameters appropriately changed in the execution, and the like. The CPU 801, the ROM 803, and the RAM 805 are coupled to one another by the host bus 807 including an internal bus such as a CPU bus. Further, the host bus 807 is coupled to the external bus 811 such as a PCI (Peripheral Component Interconnect/Interface) bus through the bridge 809.

The storage apparatus 819 is an apparatus for storing data configured as an example of a storage section of the information processing system 10. The storage apparatus 819 includes, for example, a magnetic storage device such as an HDD (Hard Disk Drive), a semiconductor storage device, an optical storage device, a magneto-optical storage device, or the like. This storage apparatus 819 stores programs to be executed by the CPU 801, various types of data, various types of data externally acquired, and the like.

The drive 821 is a reader/writer for the removable storage medium 827 such as a magnetic disk, an optical disk, a magneto-optical disk, or a semiconductor memory, and is built in or externally attached to the information processing system 10. The drive 821 reads information recorded in the attached removable storage medium 827, and outputs the read information to the RAM 805. In addition, the drive 821 is also able to write information into the attached removable storage medium 827.

The coupling port 823 is a port for direct coupling a device to the information processing system 10. Examples of the coupling port 823 may include a USB (Universal Serial Bus) port, an IEEE1394 port, a SCSI (Small Computer System Interface) port, and the like. In addition, the coupling port 923 may be an RS-232C port, an optical audio terminal, an HDMI (registered trademark) (High-Definition Multimedia Interface) port, or the like. Coupling an external coupling device 829 to the coupling port 823 may allow for exchange of various types of data between the information processing system 10 and the external coupling device 829.

The communication apparatus 825 is, for example, a communication interface including a communication device or the like for coupling to a network 831. The communication apparatus 825 may be, for example, a communication card or the like for wired or wireless LAN (Local Area Network), Bluetooth (registered trademark), or WUSB (Wireless USB). In addition, the communication apparatus 825 may be a router for optical communication, a router for ADSL (Asymmetric Digital Subscriber Line), a modem for various types of communication, or the like. The communication apparatus 825 is able to transmit and receive signals or the like to and from the Internet or any other communication devices in accordance with a predetermined protocol such as TCP/IP, for example. In addition, the network 831 coupled to the communication apparatus 825 includes a network coupled by wire or wirelessly, and may be, for example, the Internet, a domestic LAN, infrared communication, radio wave communication, satellite communication, or the like.

2. CONCLUSION

As described above, according to the embodiment of the present disclosure, there is provided an information processing apparatus including a display controller that controls display of a displayed image in at least one display region of a plurality of display regions on the basis of an input position detected on the basis of a captured image, in which the plurality of display regions includes a first display region and a second display region, and in a case where the input position has moved to an overlap region where the first display region and the second display region overlap with each other, the display controller controls display of the displayed image in the overlap region on the basis of the input position before moving the overlap region (being present outside the overlap region).

This configuration allows for enhancement of quality of a displayed image in an overlap region among a plurality of display regions even in a case where the position of the displayed image is changed.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure may arrive at various alterations and modifications within the scope of the technical idea described in the appended claims, and it is understood that such alterations and modifications naturally fall within the technical scope of the present disclosure.

Furthermore, the effects described herein are merely illustrative and exemplary, and not limitative. That is, the technology according to the present disclosure may exert other effects that are apparent to those skilled in the art from the description herein, in addition to the above-described effects or in place of the above-described effects.

In addition, in the above description, a case has been mainly described where a camera is used as a device for imaging. However, as the device for imaging, an apparatus other than the camera may be used. For example, as the device for imaging, a two-dimensional PSD (Position Sensitive Device) or the like may be used.

In addition, in the above description, a case has been mainly described where a displayed image moves on a screen. However, the displayed image may stand still on the screen. For example, a displayed image standing still may be projected onto an overlap region among a plurality of screens. At this time, displayed images (static displayed images) standing still that are projected onto the overlap region from a plurality of projectors may be combined as described above. By doing so, similarly to dynamic displayed images, the static displayed images may be smoothly linked with one another before and after moving over the overlap region and a non-overlap region.

It is to be noted that the following configurations also fall within the technical scope of the present disclosure.

(1)

An information processing apparatus including:

a display controller that controls display of a displayed image in at least one display region of a plurality of display regions on the basis of an input position detected on the basis of a captured image, in which the plurality of display regions includes a first display region and a second display region, and in a case where the input position has moved to an overlap region where the first display region and the second display region overlap with each other, the display controller controls display of the displayed image in the overlap region on the basis of the input position before moving to the overlap region.

(2)

The information processing apparatus according to (1), in which the display controller controls display of the displayed image in the overlap region on the basis of from which one of a first non-overlap region with the second display region of the first display region and a second non-overlap region with the first display region of the second display region the input position moves to the overlap region.

(3)

The information processing apparatus according to (2), in which the input position includes a first input position in the first display region, and in a case where the first input position has moved from the first non-overlap region to the overlap region, the display controller gives higher priority to display of a first displayed image in the first display region than to display of a second displayed image in the second display region.

(4)

The information processing apparatus according to (3), in which the input position includes a second input position in the second display region, and in a case where the second input position has moved from the overlap region to the second non-overlap region, the display controller controls display of the second displayed image.

(5)

The information processing apparatus according to (4), in which in a case where the first input position moves in the overlap region, the display controller controls display of the first displayed image on the basis of a position after combination of the first input position and the second input position.

(6)

The information processing apparatus according to (5), in which in a case where the first input position moves in the overlap region, the display controller controls display of the first displayed image on the basis of a position after addition of a result obtained by multiplying the first input position by a first weight and a result obtained by multiplying the second input position by a second weight.

(7)

The information processing apparatus according to (6), in which the display controller controls the first weight on the basis of a first distance corresponding to the first input position and a first predetermined position of the first display region.

(8)

The information processing apparatus according to (7), in which the display controller increases the first weight with a decrease in the first distance.

(9)

The information processing apparatus according to (7) or (8), in which the first predetermined position is a boundary between the first non-overlap region and the overlap region in the first display region, and the first distance is a distance from the first input position to the boundary.

(10)

The information processing apparatus according to (7) or (8), in which the first predetermined position is a boundary between the first non-overlap region and the overlap region in the first display region, and the first distance is a distance from a middle point between the first input position and the second input position to the boundary.

(11)

The information processing apparatus according to (7) or (8), in which the first predetermined position is a barycenter of the first display region, and the first distance is a distance from the first input position to the barycenter.

(12)

The information processing apparatus according to any one of (1) to (11), in which the first display region is a display region by a first display apparatus, and the second display region is a display region by a second display apparatus different from the first display apparatus.

(13)

The information processing apparatus according to (12), in which the first display apparatus is a first projector, the first display region is a projection region by the first projector, the second display apparatus is a second projector different from the first projector, and the second display region is a projection region by the second projector.

(14)

The information processing apparatus according to any one of (1) to (13), in which the input position is a position of an operation body detected from the captured image.

(15)

The information processing apparatus according to (14), in which the operation body includes a pen type input apparatus.

(16)

The information processing apparatus according to (15), in which the input position is a position where light emission of an infrared LED or a visible LED of the input apparatus is detected.

(17)

The information processing apparatus according to any one of (4) to (11), in which the first input position is a position detected from a first captured image and transformed on the basis of a first transformation parameter, and the second input position is a position detected from a second captured image and transformed on the basis of a second transformation parameter different from the first transformation parameter.

(18)

The information processing apparatus according to (17), in which the first captured image and the second captured image are images captured by different cameras or images of different regions captured by a same camera.

(19)

An information processing method including:

controlling display of a displayed image in at least one display region of a plurality of display regions on the basis of an input position detected on the basis of a captured image, in which the plurality of display region includes a first display region and a second display region, and the information processing method including, in a case where the input position has moved to an overlap region where the first display region and the second display region overlap with each other, controlling display of the displayed image in the overlap region on the basis of the input position before moving the overlap region.

(20)

A program causing a computer to function as an information processing apparatus, the information processing apparatus including:

a display controller that controls display of a displayed image in at least one display region of a plurality of display regions on the basis of an input position detected on the basis of a captured image, in which the plurality of display regions includes a first display region and a second display region, and in a case where the input position has moved to an overlap region where the first display region and the second display region overlap with each other, the display controller controls display of the displayed image in the overlap region on the basis of the input position before moving the overlap region.

REFERENCE SIGNS LIST

10: information processing system
100: information processing apparatus
110: I/F section
121: input position detector
130: controller
131: transformation parameter calculating section
132: input position calculating section
133: screen relationship calculating section
134: display controller
140: storage section
200: input apparatus
300: sensor section
310: camera
320: camera
400: display section
410: projector
420: projector

The invention claimed is:

1. An information processing apparatus comprising:
a display controller that controls display of a displayed image in at least one display region of a plurality of display regions on a basis of an input position detected on a basis of a captured image, wherein
the plurality of display regions includes a first display region and a second display region different from the first display region,
in a case where the input position has moved to an overlap region where the first display region and the second display region overlap with each other, the display controller controls display of the displayed image in the overlap region on a basis of the input position before moving to the overlap region, and
the display controller controls a first displayed image to be displayed in the first display region corresponding to the overlap region and a second displayed image to not be displayed in the second display region corresponding to the overlap region on a basis of the input position moving from a first non-overlap region with the second display region of the first display region to the overlap region.

2. The information processing apparatus according to claim 1, wherein
the input position includes a first input position in the first display region, and
in a case where the first input position has moved from the first non-overlap region to the overlap region, the display controller gives higher priority to display of the first displayed image in the first display region than to display of the second displayed image in the second display region.

3. The information processing apparatus according to claim 2, wherein
the input position includes a second input position in the second display region, and
in a case where the second input position has moved from the overlap region to a second non-overlap region, the display controller controls display of the second displayed image.

4. The information processing apparatus according to claim 3, wherein in a case where the first input position moves in the overlap region, the display controller controls display of the first displayed image on a basis of a position after combination of the first input position and the second input position.

5. The information processing apparatus according to claim 3, wherein
the first input position is a position detected from a first captured image and transformed on a basis of a first transformation parameter, and
the second input position is a position detected from a second captured image and transformed on a basis of a second transformation parameter different from the first transformation parameter.

6. The information processing apparatus according to claim 5, wherein the first captured image and the second captured image are images captured by different cameras or images of different regions captured by a same camera.

7. The information processing apparatus according to claim 1, wherein
the first display region is a display region by a first display apparatus, and
the second display region is a display region by a second display apparatus different from the first display apparatus.

8. The information processing apparatus according to claim 7, wherein
the first display apparatus is a first projector,
the first display region is a projection region by the first projector,
the second display apparatus is a second projector different from the first projector, and
the second display region is a projection region by the second projector.

9. The information processing apparatus according to claim 1, wherein the input position is a position of an operation body detected from the captured image.

10. The information processing apparatus according to claim 9, wherein the operation body includes a pen type input apparatus.

11. The information processing apparatus according to claim 10, wherein the input position is a position where light emission of an infrared LED or a visible light LED of the input apparatus is detected.

12. The information processing apparatus according to claim 1, wherein the display controller controls the second displayed image to be displayed in the second display region corresponding to the overlap region and the first displayed image to not be displayed in the first display region corresponding to the overlap region on a basis of the input position moving from a second non-overlap region with the first display region of the second display region to the overlap region.

13. An information processing apparatus comprising:
a display controller that controls display of a displayed image in at least one display region of a plurality of display regions on a basis of an input position detected on a basis of a captured image, wherein
the plurality of display regions includes a first display region and a second display region,
in a case where the input position has moved to an overlap region where the first display region and the second display region overlap with each other, the display controller controls display of the displayed image in the overlap region on a basis of the input position before moving to the overlap region,
the display controller selects between controlling display of a first displayed image in the first display region corresponding to the overlap region and displaying of a second displayed image in the second display region corresponding to the overlap region on a basis of from which one of a first non-overlap region with the second display region of the first display region and a second non-overlap region with the first display region of the second display region the input position moves to the overlap region,
the input position includes a first input position in the first display region,
in a case where the first input position has moved from the first non-overlap region to the overlap region, the display controller gives higher priority to display of the first displayed image in the first display region than to display of the second displayed image in the second display region,
the input position includes a second input position in the second display region,
in a case where the second input position has moved from the overlap region to the second non-overlap region, the display controller controls display of the second displayed image,
in a case where the first input position moves in the overlap region, the display controller controls display of the first displayed image on a basis of a position after combination of the first input position and the second input position, and
in a case where the first input position moves in the overlap region, the display controller controls display of the first displayed image on a basis of a position after addition of a result obtained by multiplying the first input position by a first weight and a result obtained by multiplying the second input position by a second weight.

14. The information processing apparatus according to claim 13, wherein the display controller controls the first weight on a basis of a first distance corresponding to the first input position and a first predetermined position of the first display region.

15. The information processing apparatus according to claim 14, wherein the display controller increases the first weight with a decrease in the first distance.

16. The information processing apparatus according to claim 14, wherein
the first predetermined position is a boundary between the first non-overlap region and the overlap region in the first display region, and
the first distance is a distance from the first input position to the boundary.

17. The information processing apparatus according to claim 14, wherein
the first predetermined position is a boundary between the first non-overlap region and the overlap region in the first display region, and
the first distance is a distance from a middle point between the first input position and the second input position to the boundary.

18. The information processing apparatus according to claim 14, wherein
the first predetermined position is a barycenter of the first display region, and
the first distance is a distance from the first input position to the barycenter.

19. An information processing method comprising:
controlling display of a displayed image in at least one display region of a plurality of display regions on a basis of an input position detected on a basis of a captured image, wherein the plurality of display region includes a first display region and a second display region different from the first display region;
controlling, in a case where the input position has moved to an overlap region where the first display region and the second display region overlap with each other, display of the displayed image in the overlap region on a basis of the input position before moving the overlap region; and
controlling a first displayed image to be displayed in the first display region corresponding to the overlap region and a second displayed image to not be displayed in the second display region corresponding to the overlap region on a basis of the input position moving from a first non-overlap region with the second display region of the first display region to the overlap region.

20. A non-transitory computer-readable medium having embodied thereon a program, which when executed by a computer causes the computer to execute an information processing method, the information processing method comprising:

controlling display of a displayed image in at least one display region of a plurality of display regions on a basis of an input position detected on a basis of a captured image, wherein the plurality of display regions includes a first display region and a second display region different from the first display region;

controlling, in a case where the input position has moved to an overlap region where the first display region and the second display region overlap with each other, display of the displayed image in the overlap region on a basis of the input position before moving the overlap region; and controlling a first displayed image to be displayed in the first display region corresponding to the overlap region and a second displayed image to not be displayed in the second display region corresponding to the overlap region on a basis of the input position moving from a first non-overlap region with the second display region of the first display region to the overlap region.

* * * * *